(12) United States Patent
Kuster et al.

(10) Patent No.: US 12,514,222 B2
(45) Date of Patent: Jan. 6, 2026

(54) AUTOMATIC PET FEEDER

(71) Applicant: Reliable Pet Solutions, LLC, Mesa, AZ (US)

(72) Inventors: Laura Kuster, Salem, OR (US); Terry Lynn Houchin, Bakersfield, CA (US); Kelly Wai Hung Law, Hong Kong (CN)

( * ) Notice: Subject to any disclaimer, the term of this patent is extended or adjusted under 35 U.S.C. 154(b) by 68 days.

(21) Appl. No.: 18/379,652

(22) Filed: Oct. 12, 2023

(65) Prior Publication Data

US 2024/0156051 A1 May 16, 2024

Related U.S. Application Data

(60) Provisional application No. 63/415,353, filed on Oct. 12, 2022.

(51) Int. Cl.
*A01K 5/02* (2006.01)

(52) U.S. Cl.
CPC .......... *A01K 5/0258* (2013.01); *A01K 5/0225* (2013.01); *A01K 5/0275* (2013.01); *A01K 5/0291* (2013.01)

(58) Field of Classification Search
CPC ............................................. A01K 5/02–0283
See application file for complete search history.

(56) References Cited

U.S. PATENT DOCUMENTS

| | | | | |
|---|---|---|---|---|
| 3,150,798 A | * | 9/1964 | Sutton ................... | A01K 5/0283 222/413 |
| 3,949,863 A | * | 4/1976 | Lippi ..................... | B65G 33/24 198/666 |
| 3,955,537 A | | 5/1976 | Yujiri | |
| 4,665,862 A | * | 5/1987 | Pitchford, Jr. ....... | A01K 5/0275 119/51.11 |
| 4,735,171 A | * | 4/1988 | Essex .................... | A01K 5/0291 119/56.2 |
| 5,335,619 A | * | 8/1994 | Pollock ................. | B65G 19/16 119/57.4 |
| 5,363,805 A | * | 11/1994 | Wing .................... | A01K 5/0291 119/51.11 |

(Continued)

FOREIGN PATENT DOCUMENTS

| | | | | |
|---|---|---|---|---|
| CN | | 2341393 Y | * 10/1999 | |
| CN | | 113796328 A | * 12/2021 | ........... A01K 5/0114 |

(Continued)

OTHER PUBLICATIONS

Merged translation of CN_2341393 (Year: 1999).*
Merged translation of CN_113796328 (Year: 2021).*

*Primary Examiner* — Morgan T Jordan
(74) *Attorney, Agent, or Firm* — Laurence C. Begin

(57) ABSTRACT

An automatic pet feeding system contains a first hopper adapted to contain food and an inner second hopper adapted to receive food from the first hopper. A movable screw operably communicates with the second hopper, and is configured to rotate at a predetermined time, and extrude food therethrough. The movable screw includes a periphery, an inlet, and an outlet. A screw housing contains the movable screw such that the movable screw is adapted to slidably engage an inner wall of the screw housing. A dish for receipt of the food is also included. Food is provided at a predetermined weight depending on the rotation of the movable screw.

17 Claims, 24 Drawing Sheets

(56) References Cited

U.S. PATENT DOCUMENTS

| | | | |
|---|---|---|---|
| 6,367,417 B1 * | 4/2002 | Gal | A01K 5/0283 |
| | | | 119/51.5 |
| 6,988,465 B2 * | 1/2006 | Park | A01K 5/0291 |
| | | | 119/57.1 |
| 7,284,499 B1 * | 10/2007 | Kuster | A01K 7/025 |
| | | | 119/61.5 |
| 10,948,336 B2 * | 3/2021 | Gauger | A47J 47/01 |
| 2005/0011465 A1 | 1/2005 | Park | |
| 2005/0217591 A1 * | 10/2005 | Turner | A01K 5/0114 |
| | | | 119/51.02 |
| 2013/0333662 A1 | 12/2013 | Jin et al. | |
| 2020/0375146 A1 * | 12/2020 | Eakin | B65D 88/68 |

FOREIGN PATENT DOCUMENTS

| | | | |
|---|---|---|---|
| WO | WO-2007055973 A2 * | 5/2007 | A01K 5/0114 |
| WO | WO 2019/058311 | 3/2019 | |

* cited by examiner

AUTOMATIC PET FEEDER

CROSS-REFERENCE TO RELATED APPLICATIONS

This application claims the benefit of U.S. Provisional Application Ser. No. 63/415,353 having a filing date of Oct. 12, 2022, herein incorporated by reference in its entirety.

BACKGROUND OF THE INVENTION

The present invention generally relates to feeding and watering devices for animals. In particular, a combination water and food dispenser is disclosed which provides a pet with fresh food and water. It is known that insects and other pests can crawl into a pet food dish, contaminating the food and making it inedible and/or unappealing to the pet It is also known that a common problem with combination food and water dispensers is that food particles fall into the water reservoir, contaminating the water.

In further accordance with the present invention, it is also noted that many people continue to keep pets at home. Even so, people are sometimes challenged to be away from the home for the day, or perhaps for multiple days, for overtime, for travel, and so on. The ongoing care of the pets left home in such situations therefore remains a challenge. To accommodate this challenge, automatic feeding systems have been developed. Various concerns still remain, such as the propensity for various automatic feed systems to become blocked in the extruder or screw systems of the respective automatic feed system. Yet further, although automatic, modulating the amount of food and water at various times of the day may also be necessary.

SUMMARY OF THE INVENTION

The present invention addresses the problems identified above. An embodiment of the apparatus comprises a water dish member (the "first dish member") and a food dish member (the "second dish member"), wherein the water dish member comprises a first wall member enclosing the top surface of the floor member of the water dish and the food dish member comprises a second wall member enclosing the top surface of the floor member of the food dish. The food dish member is disposed above the water dish member, and may be oriented such that the food dish bottom is substantially offset from the water dish bottom—that is, only a small portion of the food dish, if any, is directly above the water dish.

The water dish member comprises a pillar member disposed upon the top surface of the floor member of the dish. The pillar member is bounded by the first wall member, but does not make contact with the first wall member. The pillar member may comprise a single piece, or may comprise a base member and a column member, wherein the pillar member supports the food dish member. An embodiment of the apparatus may further comprise a float valve, the float valve comprising an inlet, an outlet, and a float connected to valve means. Water supply means may be connected to the inlet. The float and outlet are disposed within the water dish member. The float valve allows the water level in the water dish member to be automatically raised when the water level drops sufficiently in the water dish member, causing the float to drop and the valve means to open. An embodiment of the apparatus may further comprise a food storage reservoir disposed within the food dish member. The food storage reservoir allows dry food particles to gravitationally fill the food dish member as food is consumed.

More specifically, an automatic feeding system contains a food reservoir or hopper that gravitationally feeds an inner hopper that is designed to also gravitationally feed a movable extruder or screw. The screw rotates within an outer screw housing when actuated, and controls the amount of food driven through the screw depending on predetermined settings based on weight and time, for example.

Accordingly, an automatic pet feeding system may contain: a hopper adapted to contain food; an inner hopper adapted to gravitationally receive food from the hopper; a movable screw adapted to rotate at a predetermined time, and extrude food therethrough, the screw containing a periphery, an inlet, and an outlet; a screw housing containing the movable screw whereby the movable screw is adapted to slidably engage an inner wall of the screw housing; and a dish for receipt of the food, whereby the food is provided at a predetermined weight depending on the rotation of the movable screw.

DESCRIPTION OF THE EMBODIMENTS OF THE INVENTION

Known Gravitational Feeder

Figure 1:
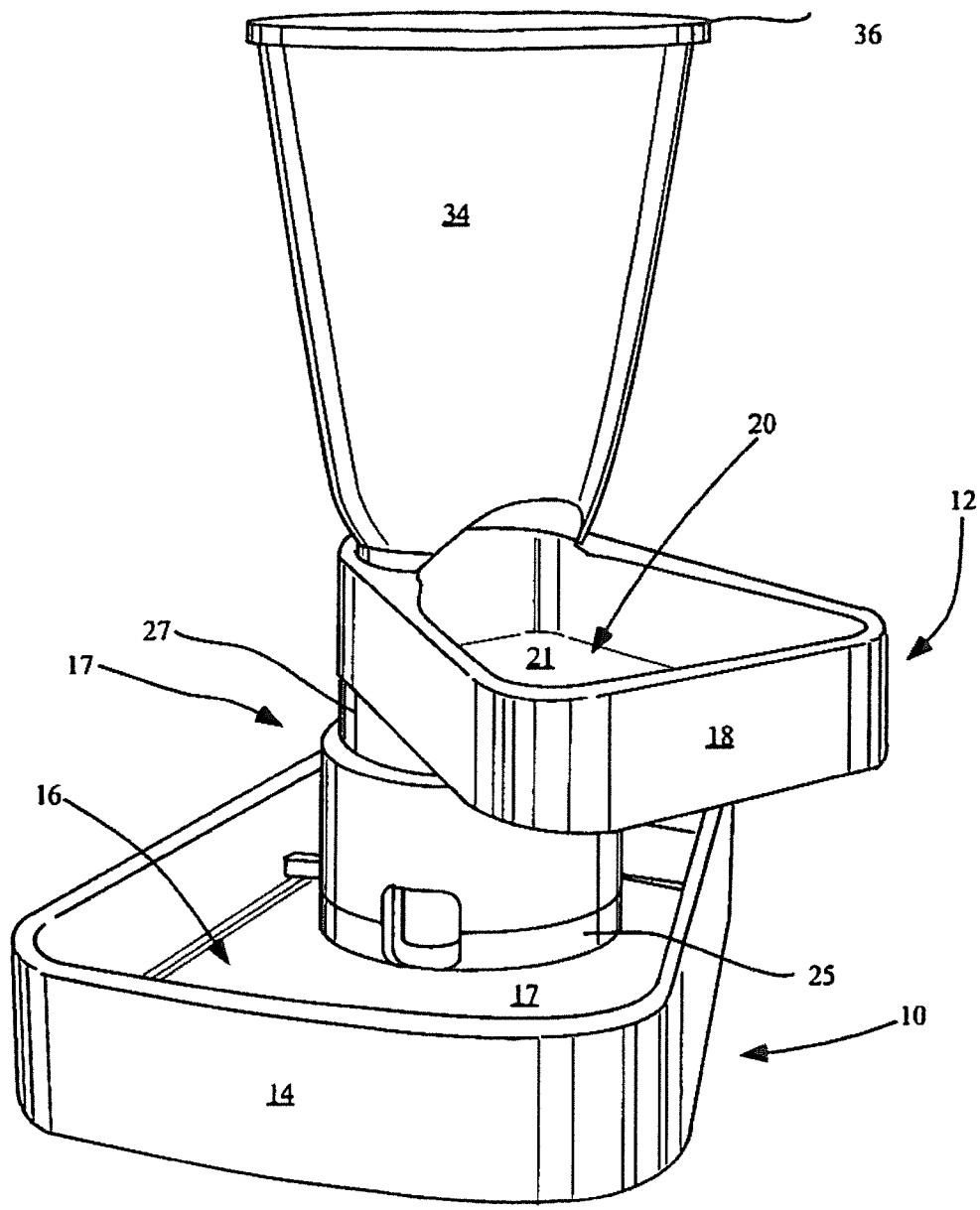
FIG. 1 shows a perspective view of one embodiment of the disclosed invention.

Referring to FIG. 1, and as described in co-owned U.S. Pat. No. 7,284,499, herein incorporated by reference, an embodiment of the apparatus comprises a first dish member 10 for providing water to a pet and a second dish member 12 for providing food to the pet, where the first dish member and second dish member are disposed in a stacked configuration. The first dish member 10 comprises a first floor 16. The first floor 16 comprises a first top surface 17 and a first bottom surface 19. First wall member 14 encloses the first top surface 17 of the first dish member 10. The second dish member 12 comprises a second floor 20. The second floor 20 comprises a second top surface 21 and a second bottom surface 23. A second wall member 18 encloses the top surface 21. The first dish member 10 further comprises an upwardly extending pillar member 22 affixed to the first top surface 17. The pillar member 22 may comprise a single piece which connects first dish member 10 to second dish member 12, and maintains these members in vertical spaced apart relation with one another. Alternatively, pillar member 22 may comprise a plurality of sections including base member 25 and column member 27. The base member 25 is adapted to receive column member 27, wherein the column member supports the second dish member 12. Column member 27 may attach to base member 25 via friction fit or other known means of attachment, such that second dish member 12 and column member 27 are removable, facilitating cleaning of the various components of the apparatus. The top of the column member 27 is adapted to attach to the second bottom surface 23 of the second dish member 12.

Figure 8:
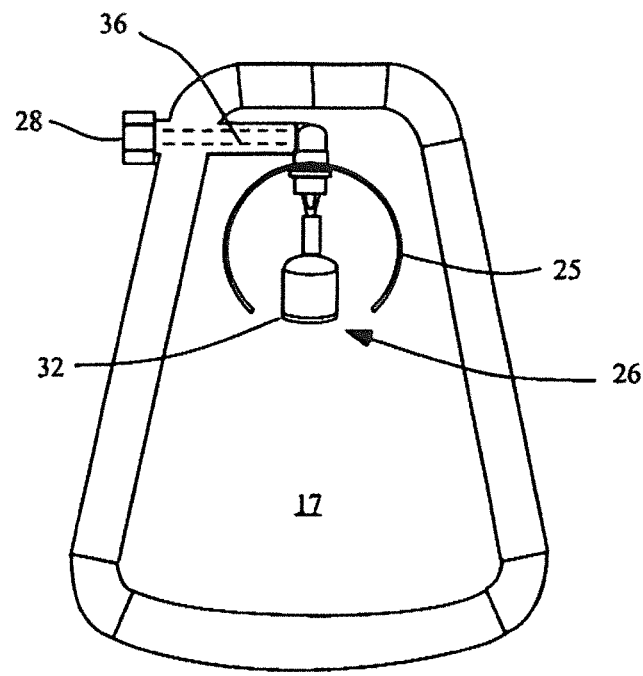
FIG. 8 shows how a top view of the device with the second dish member removed to show how a float valve may be set within the pillar member in an embodiment of the apparatus.
Figure 9:
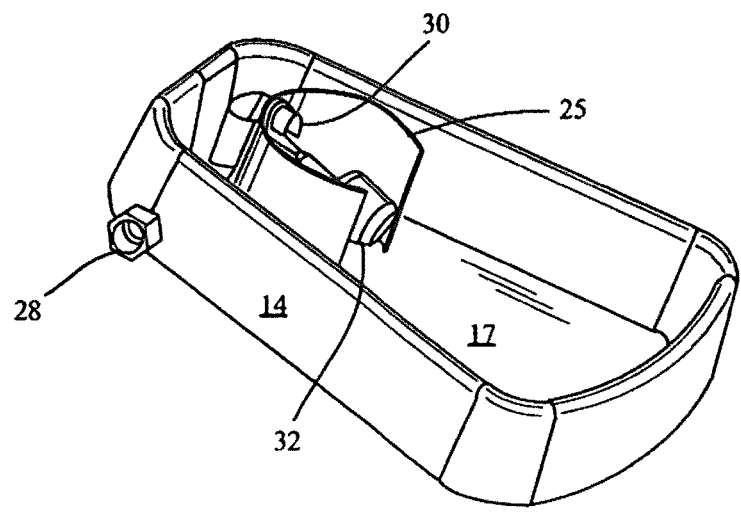
FIG. 9 is a perspective view of the device as shown in FIG. 8.

The base member 25 may comprise an arcuate wall member as shown in FIGS. 8-9. The bottom of column member 27 may attach to base member 25 via friction fit or other known means of attachment. Base member 25 and column member 27 may be so oriented as to define a vertical axis. As shown in the various figures, the second dish member 12 may be disposed above the first dish member 10 in such a way that the second dish is substantially offset from the first dish about the vertical axis defined by the base member 25 and the column member 27. The friction attachment of base member 25 and column member 27 to one another enables the user to adjust the offset between first dish member 10 and second dish member 12 as desired. This feature of the device allows the user to orient the respect dish members in such a manner as to prevent or reduce food from falling from second dish member 12 into water which may be stored in first dish member 10. This feature also provides easier access to the first dish 10 by the pet, because second dish member 12 is not blocking access to first dish member 10.

As shown in the figures, the first dish member 10 and the second dish member 12 may generally comprise the same shape. However, the first dish member 10 may be sized larger than the second dish member 12 to increase the stability of the device. The first dish member 10 and second dish member may comprise a variety of shapes, including the trapezoidal shapes shown in the figures. Pillar member 22 is peripherally bound by the first wall member 14, but does not make contact with the wall member. This feature of the device causes a "moat" to be formed around the pillar member 22 by the remainder of the first dish member 10, such that water contained within the dish member will prevent or discourage pests from gaining access to pillar member 22. As shown by the Figures, the only access crawling insects have to the food dish member 12 is by crawling up pillar member 22, and this access is precluded by the water contained within the first dish member 10.

The apparatus may further comprise means for replenishing the water in first dish member 10. For example, a bottle reservoir may be attached to the first dish member 10, wherein the bottle reservoir is inverted, and the mouth of the bottle set at the desired water level line within the first dish member 10. As the water level in the first dish member 10 drops, water gravitates from the bottle into the first dish member 10. The bottle reservoir may be stored within the upwardly extending pillar member 22.

Figure 6:
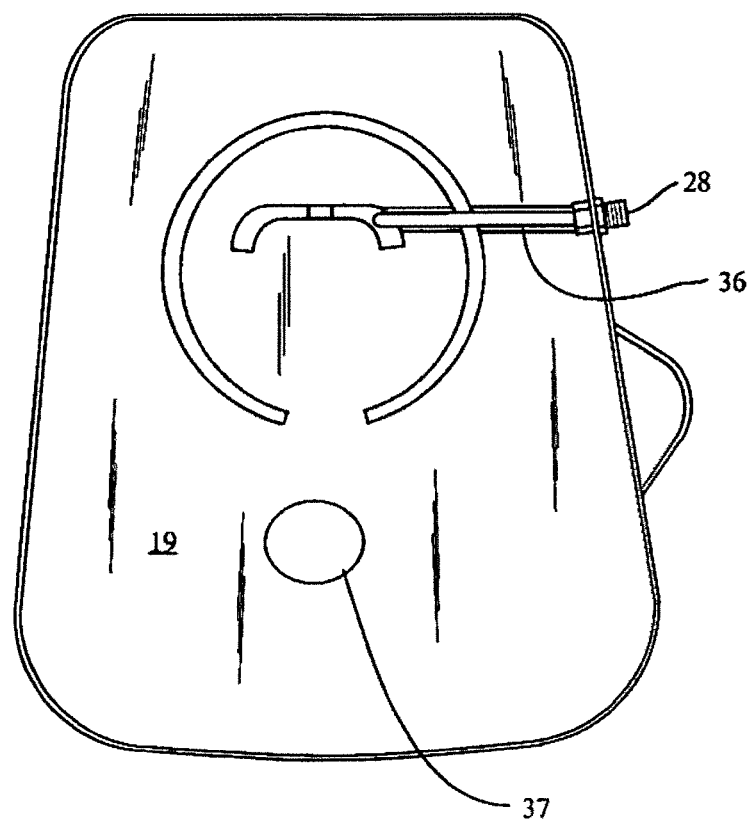
FIG. 6 shows a bottom view the embodiment shown in FIG. 1.
Figure 7:
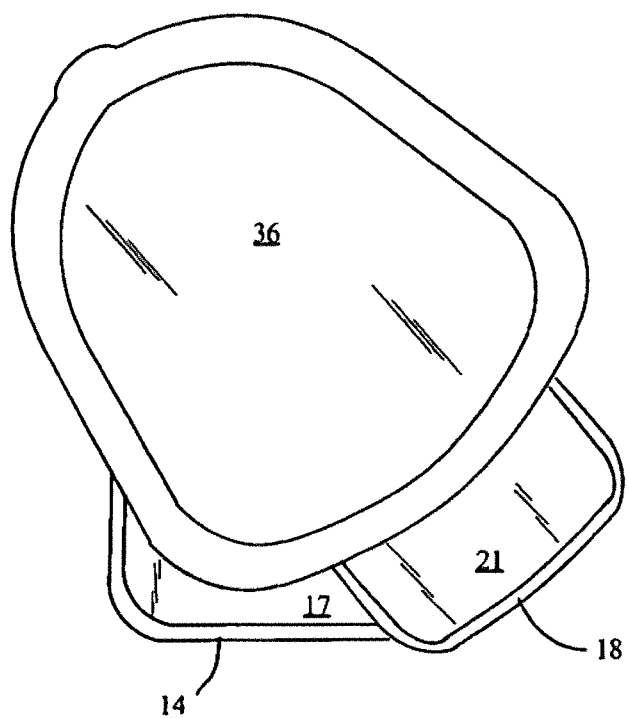
FIG. 7 shows a to view of the embodiment shown in FIG. 1.

Alternatively, as shown in FIGS. 8-9, the means for replenishing the water in the first dish member 10 may comprise a float valve apparatus 26. The float valve 26 comprises an inlet 28, an outlet 30, and a float 32 connected to valve means. Water supply means may be connected to the inlet 28. The float 32 and the outlet 30 are disposed within the water dish member 10. The float valve 26 allows the water level in the water dish member 10 to be automatically raised when the water level drops sufficiently in the water dish member, causing the float 32 to drop and the valve means to open. As shown in FIGS. 8-9, components of the float valve 26 may be disposed within base member 25 of the pillar member 22. It is to be appreciated that the conduit 36 providing water to the float valve may be configured in such a way that it does not provide a "bridge" to the pillar member 22. This may be accomplished by configuring conduit 36 in such a manner that it will be kept submerged in the first dish member 10 below the minimum water level as adjusted by the float valve 26. Conduit 36 may be configured to be placed in the first bottom surface 19 of first floor 16 as shown in FIG. 6. Conduit 36 may also comprise an integral part of first floor 16.

Figure 2:
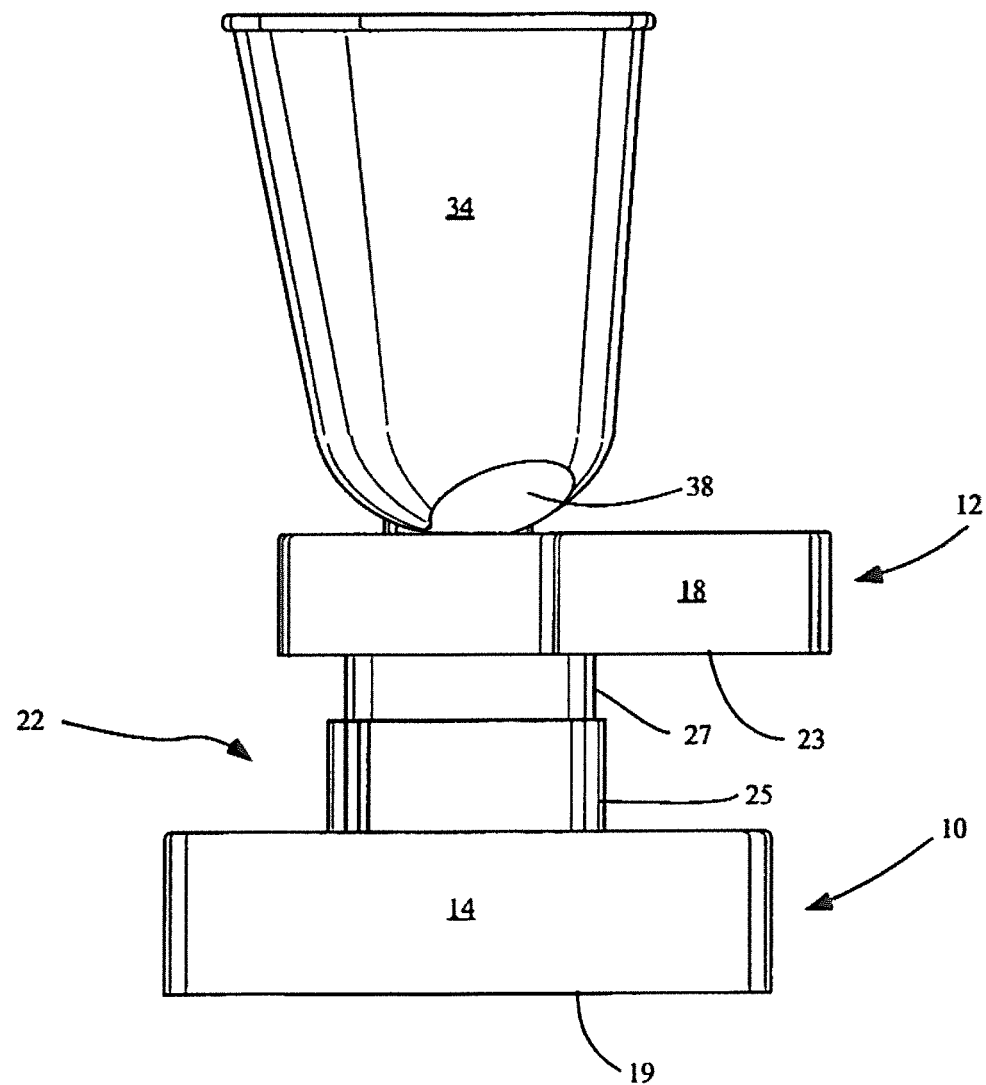
FIG. 2 shows a front view of the embodiment shown in FIG. 1.
Figure 3:
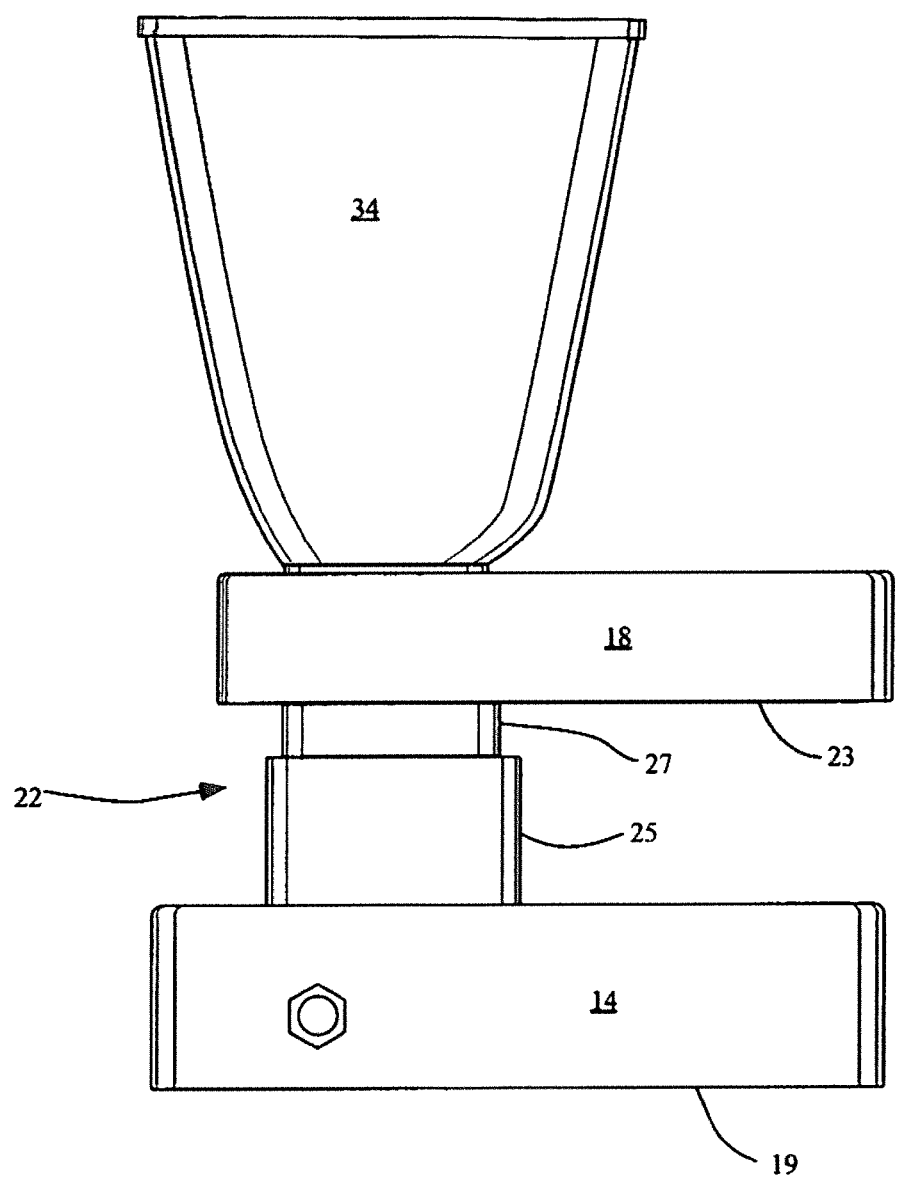
FIG. 3 shows a right-side view of the embodiment shown in FIG. 1
Figure 4:
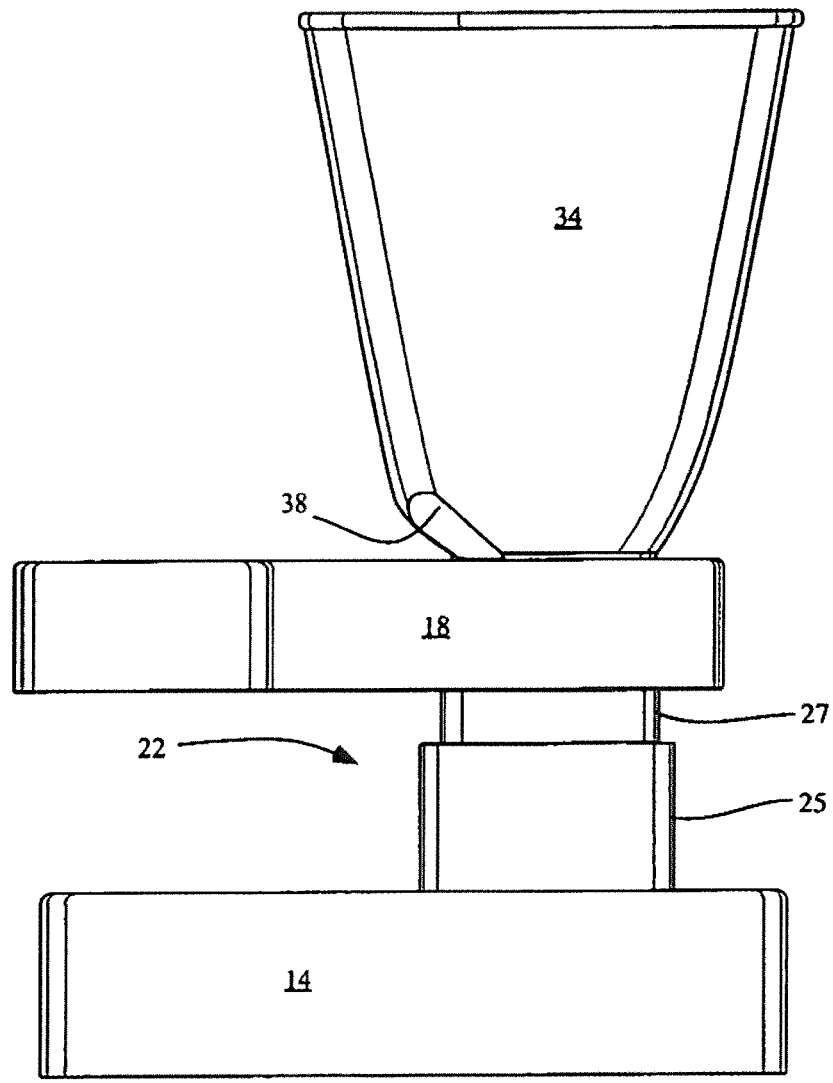
FIG. 4 shows a left side view of the embodiment shown in FIG. 1.
Figure 5:
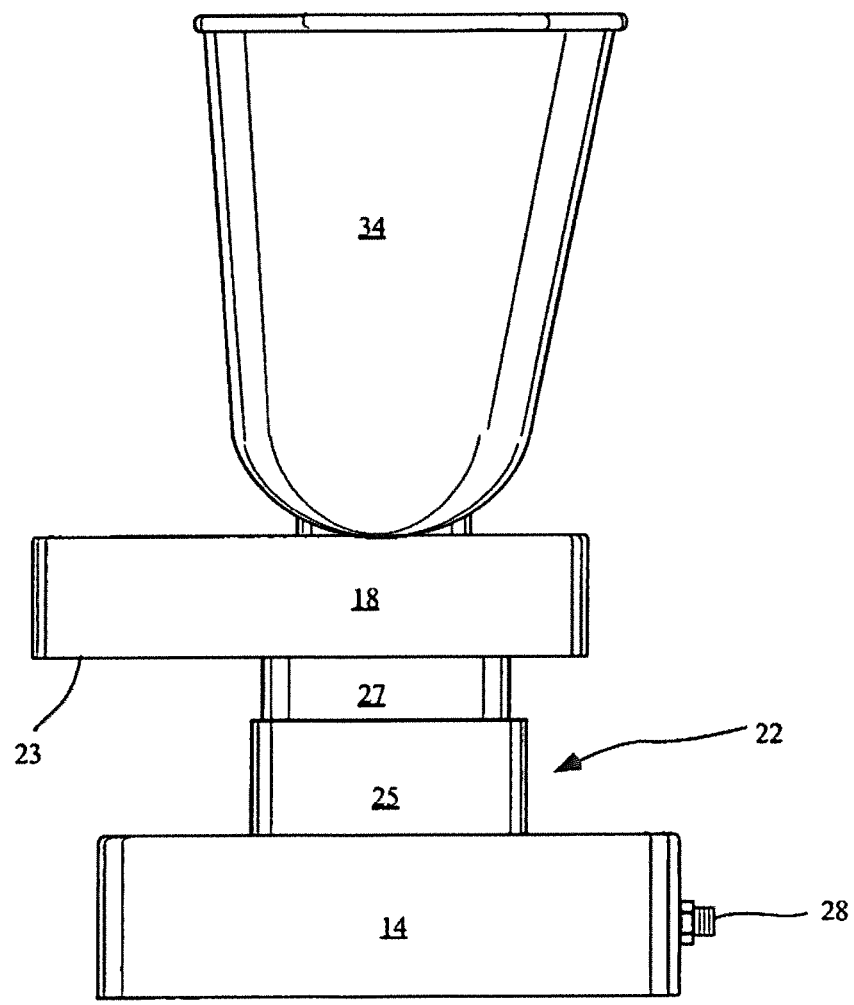
FIG. 5 shows a rear view the embodiment shown in FIG. 1.

As also shown in FIG. 6, the apparatus may also comprise a thermostatically controlled heating element 37 which prevents the water in first water dish member from freezing. Heating element 37 is battery operated to prevent any risk of harm to the pet. An embodiment of the apparatus may further contain a food storage reservoir 34 disposed within the food dish member 12. Food storage reservoir 34 allows dry food particles to gravitationally fill the food dish member 12 as food is consumed. It is to be appreciated that while food storage reservoir 34 is shown in FIGS. 1-2 as generally funnel shaped, it may be configured in many different shapes. Additional, food storage reservoir 34 may further comprise a top member 36 which covers the food contained within the reservoir. The top member may be configured to either be completely removable, or to attach to the food storage reservoir with pivoting attachment means. Food storage reservoir 34 comprises an opening 38 which allows food contained within the food storage reservoir to gravitate into the food dish member 12 as the food level in the dish member drops as the food is consumed.

Many of the components of the apparatus, including the first dish member 10, second dish member 12, pillar member 22, and food storage reservoir 34, may be fabricated from molded high impact plastic.

Automatic Pet Feeder

Figure 10:
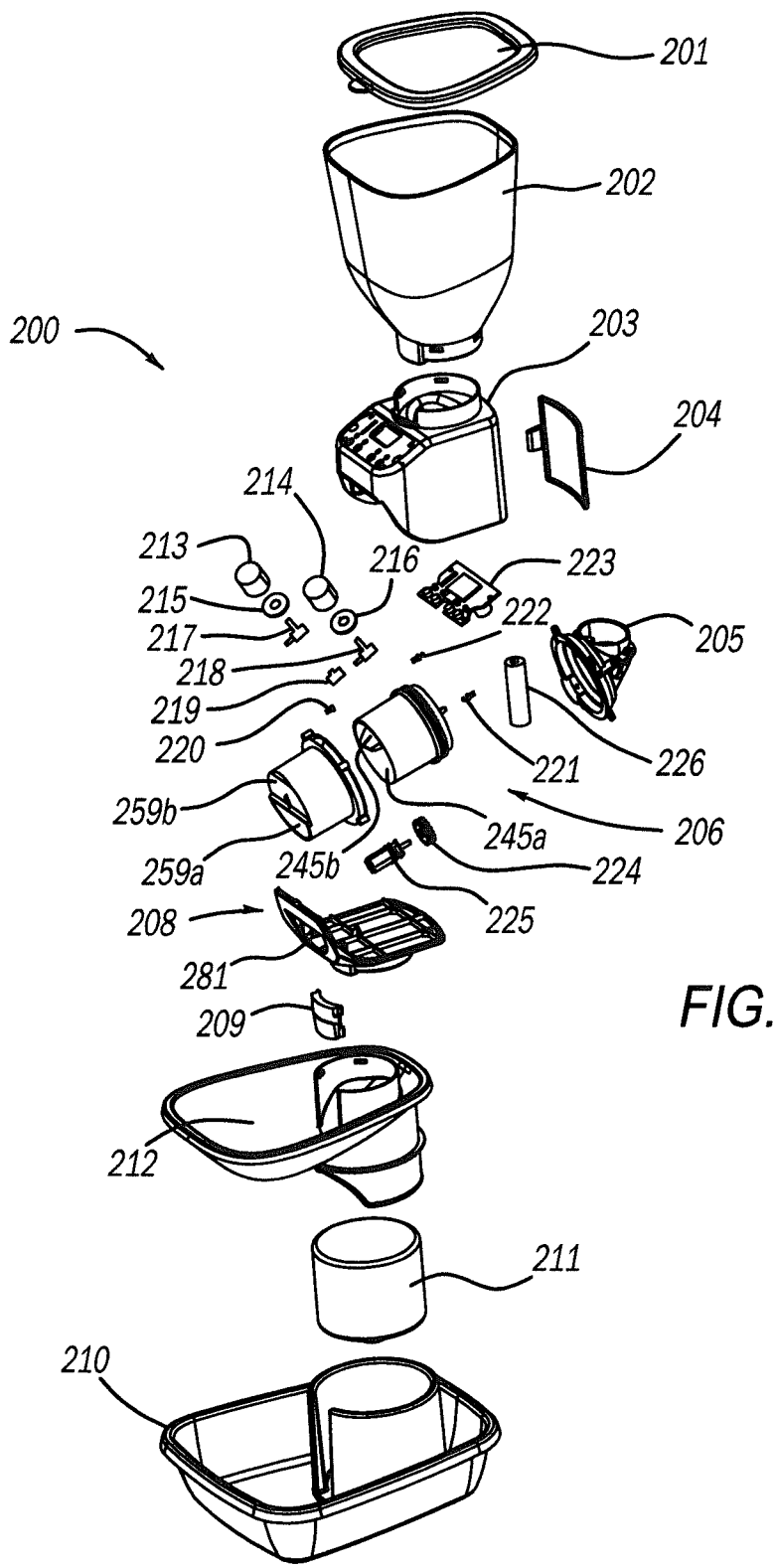
FIG. 10 is an exploded view of a first embodiment of an automatic pet feeding system or automatic pet feeder, in accordance with the present invention.

In accordance with the present invention, and in an exemplary embodiment as shown in FIG. 10, the food may be dispensed from a hopper or food reservoir 202 by an automatic pet feeder 200 included within the overall food and water dispenser 100 described above. It will be appreciated that the automatic feeder system 200 may be configured and positioned between the hopper or food storage reservoir 34 or 202, and the second dish 212. Accordingly, a cylindrical spiral extruder pet feeder 200 contains a top shell 203 operably connected to a food hopper or food storage reservoir 202, by snaps, screws, or threads, for example. If desired, a lid 201 may cover the hopper 202 to ensure the food remains clean. As shown in the figures, a first bottom port 231 (circular or otherwise shaped) on the hopper 202 is press fit or otherwise attached onto a first top port 233 (circular or otherwise shaped) on the shell 203, thereby providing a food conduit from the hopper 202 into the interior of the shell 203. A battery panel 204 may be removably attached to a backside or other area of the shell 203 whereby removal of the panel 204 provides access to batteries 226 stored and operably connected therein. As explained below, the batteries 226 may be used to power the motor 225 actuating the automatic feeder. As also explained below, an inner receiving cavity 244 is defined by the shell 203, for housing a number of automatic feed constituents as described below.

An inner funnel 205 may be contained within inner cavity 244 of the shell 203, and at a first end contains a second upper port 237 coaxially aligned with the first top port 233. A second bottom port 239 may be formed at a second end of the inner funnel 205. A spiral or curved food guide 251 may be integrated within the inner funnel 205 and extend from the second upper port 237 and downwardly and obliquely extend to the second bottom port 239. A first connecting flange 253 is formed about the periphery of the second bottom port 239, thereby providing structural support for containment of a movable screw 206 as described below.

Figure 11:
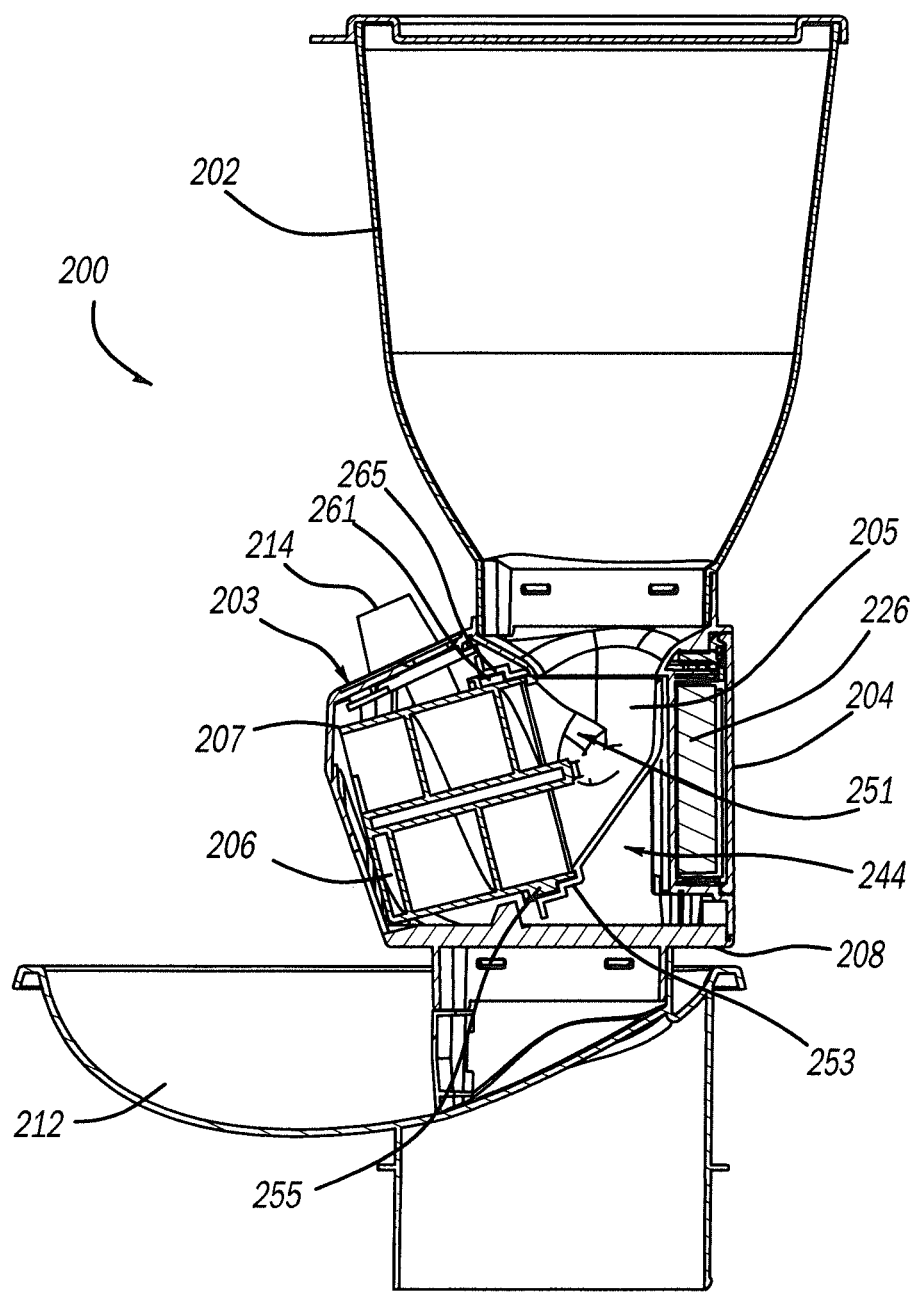
FIG. 11 is a sectional view of an automatic feed system or automatic pet feeder of FIG. 10, in accordance with the present invention.
Figure 12:
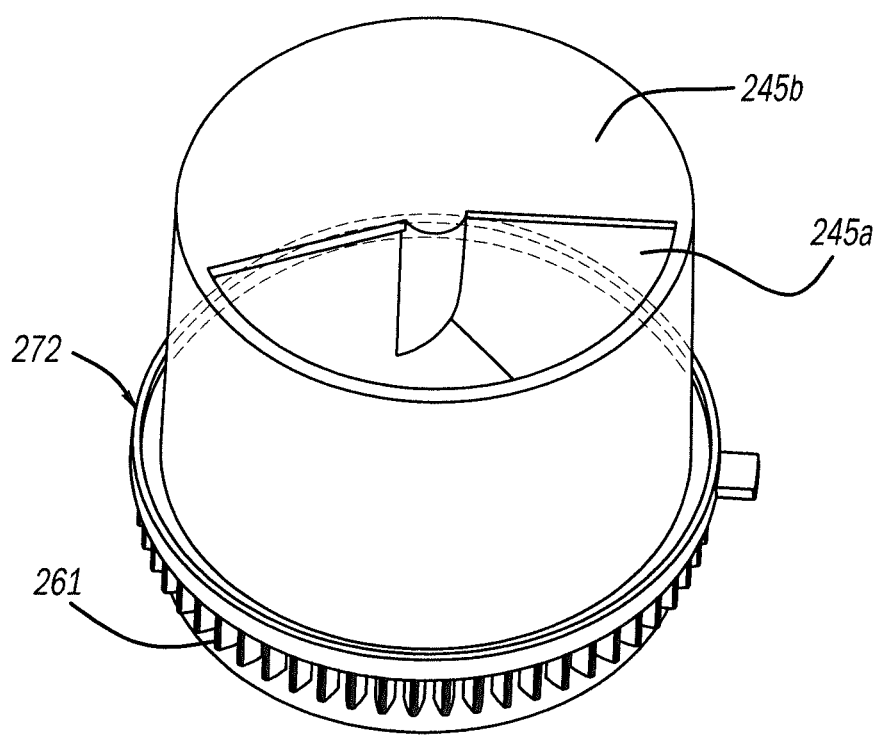
FIG. 12 is a perspective view of the movable screw or movable extruder.
Figure 13:
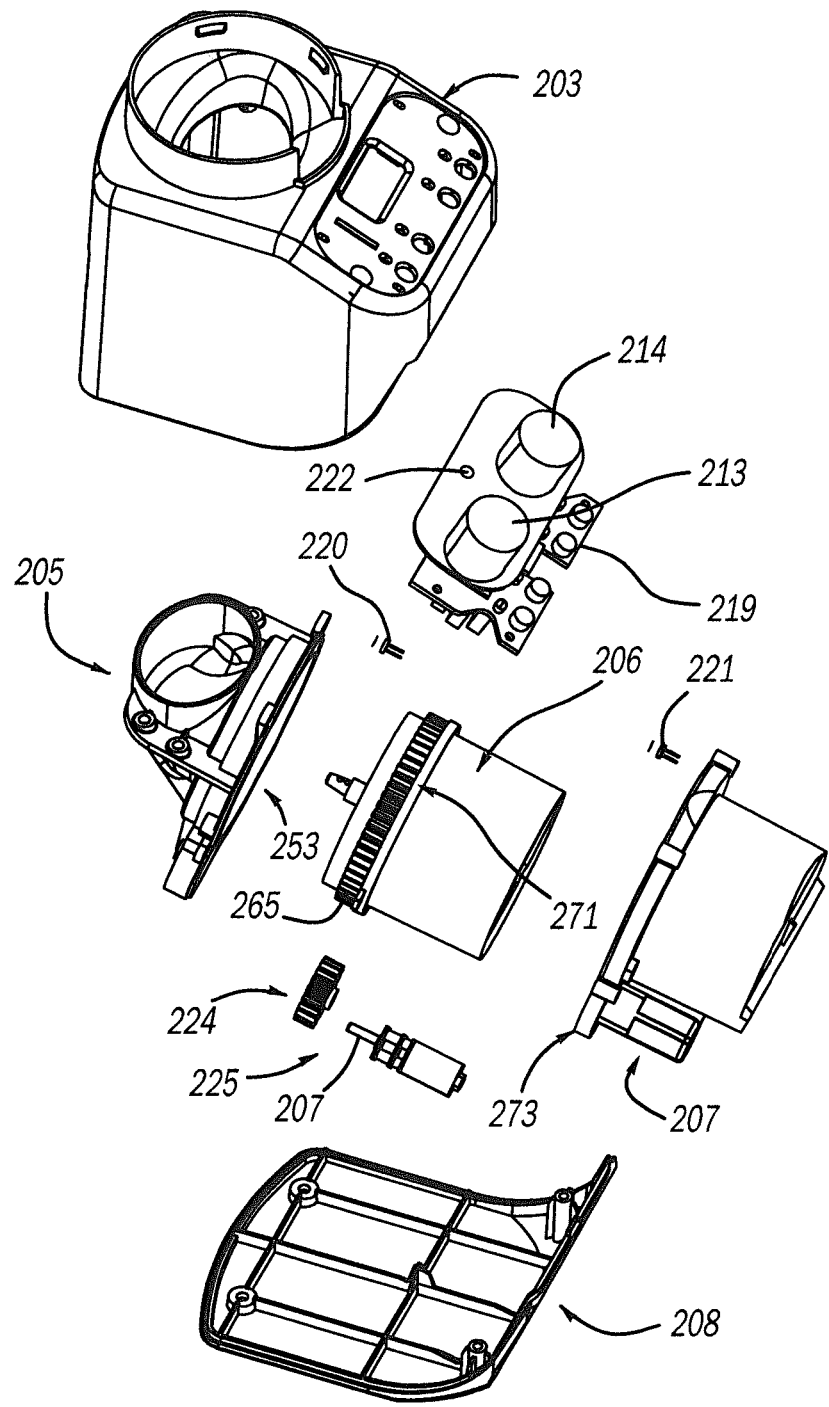
FIG. 13 is an exploded view of the movable extruder assembly.
Figure 14:
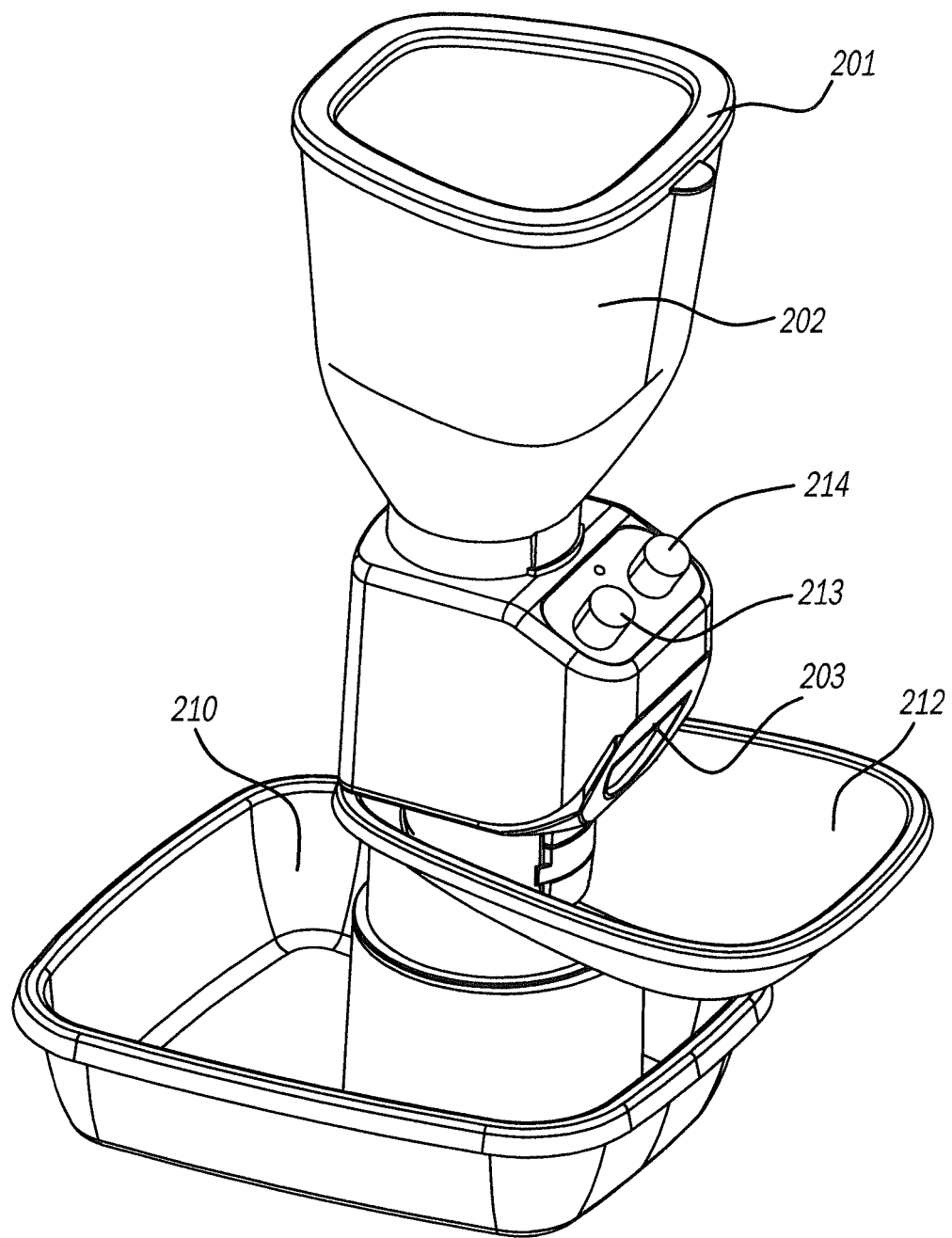
FIG. 14 is a perspective view of an assembled automatic pet feeder of FIG. 10.
Figure 15:
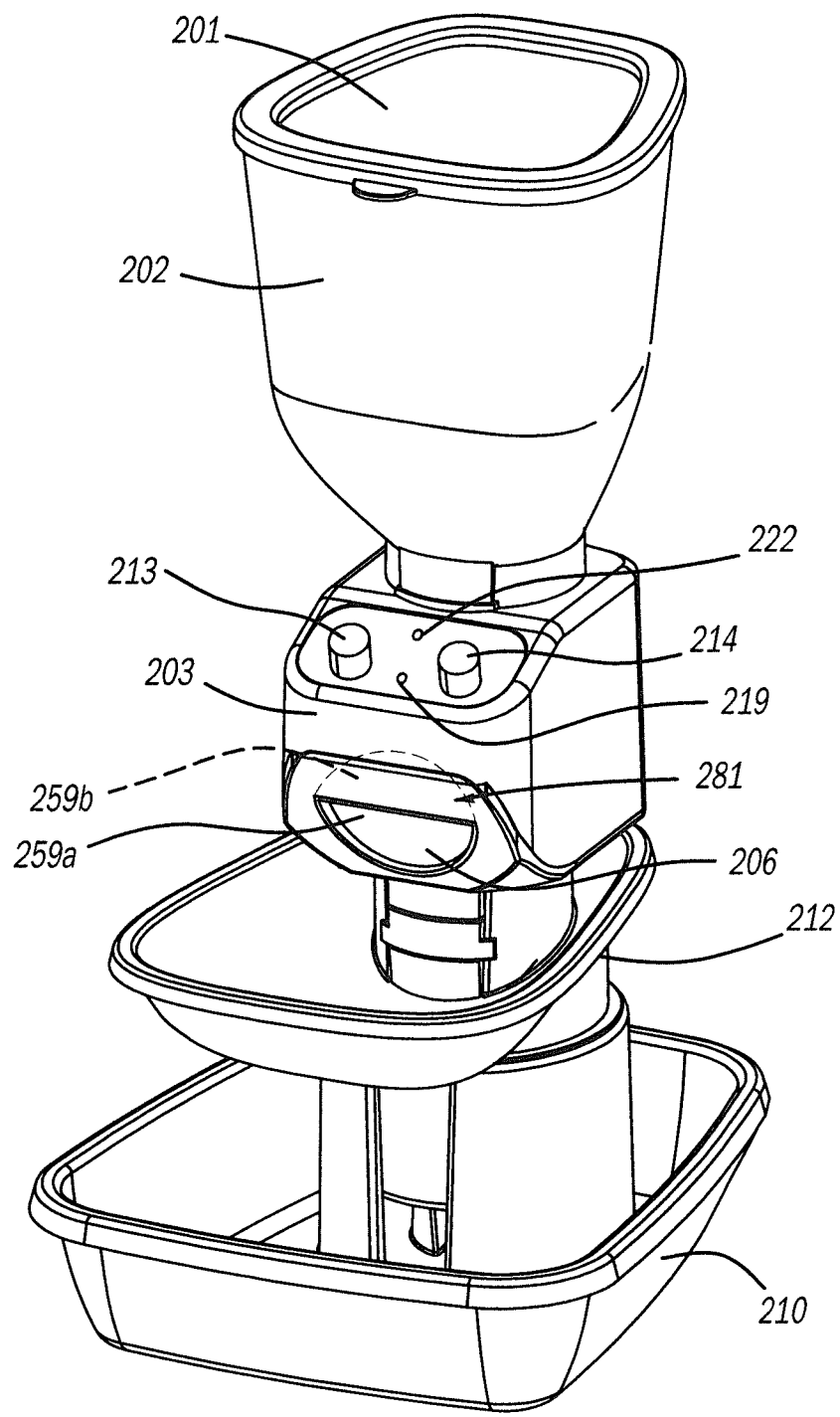
FIG. 15 is a front perspective view of an assembled automatic pet feeder of FIG. 10.
Figure 16:
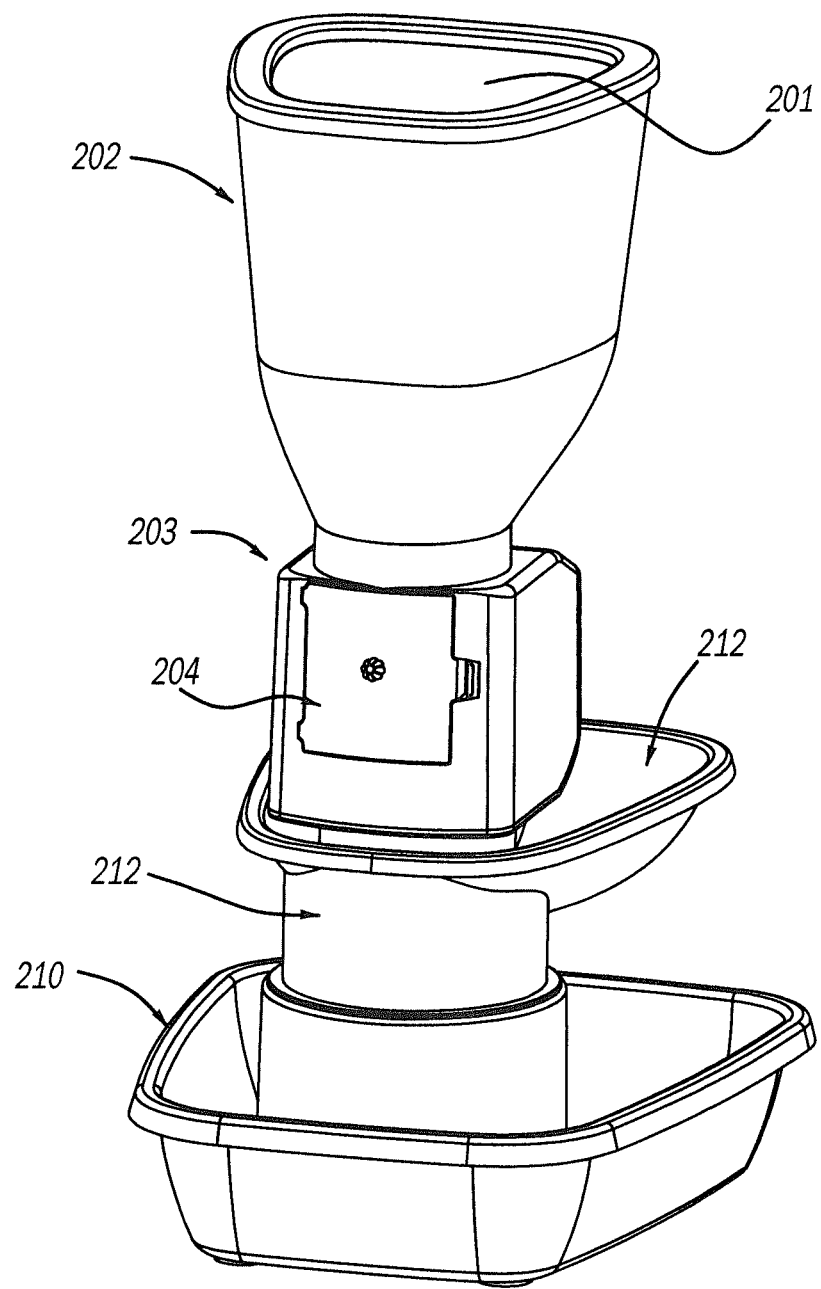
FIG. 16 is a rear perspective view of an assembled automatic pet feeder of FIG. 10.

As shown in FIGS. 10-12, a movable screw or spiral extruder 206 may also be contained within the inner cavity 244, and contains a third upper port 243 and a third bottom port 245, wherein upon movement of the spiral extruder 206, food may be extruded or routed therethrough and into the second or upper food dish 12. As shown in the drawings, the second bottom port 239 of the inner funnel 205 is coaxially aligned with the third upper port 243 of the movable screw 206. A relatively larger first gear 261 may be circumferentially formed or fixed on a screw outer wall 249, on the surface of the outer wall 249, for example. A screw or extruder housing 207 contains a fourth upper port 257 and a fourth lower port 259, wherein the fourth upper port 257 is coaxially aligned with the third upper port 243, and, the fourth lower port 259 is coaxially aligned with the third bottom port 245. The third bottom port 245 has a portion of the port blocked, such as half of the port 245 as shown in FIG. 10. The fourth bottom port 259 has a portion of the port blocked, such as half of the port 259 as shown in FIG. 10. As further described herein, as the movable screw 206 is rotated, the respective open portions 245*a* and 259*a* of each of the partially occluded ports 245 and 259, coincide or cooperate to permit a desired amount of food to come through the extruder/screw housing 207 as per each predetermined feeding cycle. At the same time, the respective closed portions 245*b* and 259*b* coincide or cooperate to contain food within the movable screw 206 and prevent food from leaving the screw 206. Stated another way, and for example, when the closed or occluded area 245*b* is aligned with the open area 259*a*, the food will be fixed and retained in the movable screw 206. When the open area 245*a* is aligned with the open area 259*a*, the food in the actuated movable screw 206 will flow through the half opening 259*a* into the food bowl 212.

Accordingly, in operation, the motor 225 drives the pinion gear 224 to rotate, thereby driving the large gear 261 and the movable screw 206 to rotate, so that the half opening 245*a* or the closed area 245*b* is aligned with the opening 259*a*, so as to provide automatic feeding in accordance with the present invention. Importantly, the motor 225, the pinion gear 24, and the large gear 261 are located outside the movable screw 206, thereby ensuring the stability and reliability of the automatic feed system 200, and also the free and unjammed flow of food therethrough.

In another aspect of the invention, an inner wall 263 of the screw housing 207 is slidably engaged over the extruder outer wall 249. A second flange 265 is formed about the periphery of the fourth upper port 257, that when engaged with the first flange 253, forms an annular groove 1C 272 for containment of the gear 261. The connecting flanges 253 and 265 may be snapped, screwed, or otherwise fixed together. While the screw housing 207 is fixed in place, the movable extruder 206 moves within the housing 207 and adjacent to the fixed inner funnel 205, as the movable extruder or screw 206 is actuated by a predetermined signal from a motor 225 (described below).

A relatively smaller pinion gear 224 meshes with the first gear 261 and operably communicates therewith for actuation of the movable screw 206. A motor 225 is operably connected to the pinion gear 224 (and fixed within the inner cavity 244) by way of a drive shaft 267, for example, to drive the pinion gear 224 and thereby drive the larger gear 261, as the pinion gear 224 enmeshed therewith turns. As a result, the movable screw or spiral extruder 206 is then moved with movement of the larger gear 261, to thereby drive food from the inner funnel 205 through the movable screw 206. The motor 225 may be powered by the batteries 226, and actuated by sensors as described below. Yet further, the screw or extruder housing 207 may also contain a second or mounting groove 273 formed within the housing 207 so that the motor 225 may be contained therein for operable communication with the pinion gear 224. It will be appreciated that the pinion gear 224 and the motor 225 are preferably contained with the inner cavity 244.

With regard to electronic controls in the system 200, the PCB board may be located in the inner cavity 244, and is electronically connected in a known manner to the motor 225, such as signal generation (PWM), for example. As such, the primary purpose of the PCB board is the actuation of the motor 225. The PCB or process control board 223 may be electronically connected to and powered by the battery pack 226 in a known manner. Or, the PCB 223 and the automatic pet feeder 200 may be electrically powered by AC energy, for example. To that end, various controls are provided that measure portions of food or time for example, as determined by predetermined settings predetermined by the user.

As shown in FIG. 10 and in other figures, a dosage regulator or knob 213 for metering out portions of food, and, a timing regulator or knob 214 for metering out the times of operation of the movable extruder 206 are connected to the PCB 223 and are installed in the top shell 203, for easy access by the user of the system 200. A variable resistor weight control 217 is operably connected to the weight or dosage regulator 213, and, a variable resistor timing control 218 is operably connected to the timing regulator or knob 214, all connected to the PCB 223. In a preferred embodiment, a first rotating spring 215 is also provided in the dosage regulator or weight adjuster 213, and also operably communicates with the variable resistance weight control 217 in a known manner. In the same way, a second rotating spring 216 is provided in the timing regulator or adjuster 214, and also operably communicates with the variable resistance control 218 in a known manner. When the user twists the weight adjustor 213 or the timing adjuster 214, the respective first rotating spring 215 or the second rotating spring 216 will be biased to rotate, whereupon the respective variable resistance weight control 217 or the variable resistor timing control 218 receives the rotation information of the respective first rotating spring 215 or the second rotating spring 216 and transmits the information to the PCB board 223. The PCB board 223 in turn will then control the rotation time of the movable screw 206 and the number of turns of the motor 225 through the information received to thereby control the amount of food, the rotation time interval of the motor 225, and the food delivery timing. Again, all controls described herein may also be powered by the battery pack 226, containing a plurality of batteries for example.

In yet another aspect of the controls, and as schematically shown in FIG. 10, for example, an infrared diode emitter 220 is installed on the screw extruder housing 207 and an infrared diode receiver 221 is installed on the movable screw or extruder 206. The infrared diode emitter 220 and the infrared diode receiver 221 mainly function for positioning the movable screw 206 movement and the screw extruder housing 207. Specifically, when the movable extruder or screw 206 rotates, the infrared diode transmitter 220 fixed thereon also rotates. When the movable infrared diode transmitter 220 and the fixed infrared diode receiver 221 align and sense, it indicates that the rotation is in place and operably communicates with and/or feeds back a signal to the PCB 223. Thereafter, the PCB 223 will control the motor 225 to stop rotating as per predetermined instructions. If desired, this embodiment may include an LED indicator 222 mounted on the top housing 203, and signally or electronically connected to the PCB 223. If desired, a testing button 219 located on the top of the top shell 203, may be provided in operable communication with the PCB 223 to confirm the amount of food dispensed.

A bottom housing 208 may be installed at the bottom of the upper housing 203 and may be snapped, fastened, screwed, or otherwise fixed into a bottom portion of the upper housing 203. In this way, the inner cavity 244 is closed up to protect and better maintain the parts contained therein. An opening 281 overlies the fourth bottom port 259 and opening 259a, thereby permitting disbursement of the food through the bottom housing 208. A door or food baffle 209 covers the opening 281 to control food release into the bowl 212.

The rest of the automated pet feeder 200 may be made as described above for the gravitational pet feeder. Referring to FIG. 1, an embodiment of the apparatus comprises a first dish member 10 for providing water to a pet and a second dish member 12 for providing food to the pet, where the first dish member and second dish member are disposed in a stacked configuration. The first dish member 10 comprises a first floor 16. The first floor 16 comprises a first top surface 17 and a first bottom surface 19. First wall member 14 encloses the first top surface 17 of the first dish member 10. The second dish member 12 comprises a second floor 20. The second floor 20 comprises a second top surface 21 and a second bottom surface 23. A second wall member 18 encloses the top surface 21. The first dish member 10 further comprises an upwardly extending pillar member 22 affixed to the first top surface 17. The pillar member 22 may comprise a single piece which connects first dish member 10 to second dish member 12, and maintains these members in vertical spaced apart relation with one another. Alternatively, pillar member 22 may comprise a plurality of sections including base member 25 and column member 27. The base member 25 is adapted to receive column member 27, wherein the column member supports the second dish member 12. Column member 27 may attach to base member 25 via friction fit or other known means of attachment, such that second dish member 12 and column member 27 are removable, facilitating cleaning of the various components of the apparatus. The top of the column member 27 is adapted to attach to the second bottom surface 23 of the second dish member 12.

The base member 25 may comprise an arcuate wall member as shown in FIGS. 8-9. The bottom of column member 27 may attach to base member 25 via friction fit or other known means of attachment. Base member 25 and column member 27 may be so oriented as to define a vertical axis. As shown in the various figures, the second dish member 12 may be disposed above the first dish member 10 in such a way that the second dish is substantially offset from the first dish about the vertical axis defined by the base member 25 and the column member 27. The friction attachment of base member 25 and column member 27 to one another enables the user to adjust the offset between first dish member 10 and second dish member 12 as desired. This feature of the device allows the user to orient the respect dish members in such a manner as to prevent or reduce food from falling from second dish member 12 into water which may be stored in first dish member 10. This feature also provides easier access to the first dish 10 by the pet, because second dish member 12 is not blocking access to first dish member 10.

As shown in the figures, the first dish member 10 and the second dish member 12 may generally comprise the same shape. However, the first dish member 10 may be sized larger than the second dish member 12 to increase the stability of the device. The first dish member 10 and second dish member may comprise a variety of shapes, including the trapezoidal shapes shown in the figures. Pillar member 22 is peripherally bound by the first wall member 14, but does not make contact with the wall member. This feature of the device causes a "moat" to be formed around the pillar member 22 by the remainder of the first dish member 10, such that water contained within the dish member will prevent or discourage pests from gaining access to pillar member 22. As shown by the Figures, the only access crawling insects have to the food dish member 12 is by crawling up pillar member 22, and this access is precluded by the water contained within the first dish member 10.

The apparatus may further comprise means for replenishing the water in first dish member 10. For example, a bottle reservoir 11 may be attached to the first dish member 10, wherein the bottle reservoir is inverted, and the mouth of the bottle set at the desired water level line within the first dish member 10. As the water level in the first dish member 10 drops, water gravitates from the bottle into the first dish member 10. The bottle reservoir 11 may be stored within the upwardly extending pillar member 22.

In operation, the food in the hopper or food reservoir 202 will gravitationally feed and enter the inner hopper 205, and then be gravitationally fed into the movable extruder or screw 206 vis a vis the guide 252. The user may adjust the feeding amount and the feeding interval time by rotating the amount or dosage regulator 213 and the timing regulator 214. After receiving the signals from the regulators 213 and 214, the PCB board 223 will send an operating signal to the motor 225 within the specified time. It should be noted that the weight or dosage amount of the food can be calibrated to be a specific amount at each automatic "feeding". Yet further, the time that each feeding occurs may be calibrated as well whereby several feeding times per day could be determined if desired. For example, the timing regulator could actually be set to determine the time lapse between any feeding and subsequent feeding.

The motor 225 then drives the pinion gear 224 to rotate, thereby driving the large gear 261 and the movable extruder or screw 206 to rotate. When the infrared diode transmitter 220 and the infrared diode receiver 221 are aligned as the movable screw 206 rotates, it may confirm that the rotation and time of rotation have occurred, and feed a signal back to the PCB board 223 confirming the same. At this time, or thereafter, depending on desired rotations, for example, the PCB board 223 will direct the movable screw 206 to stop rotating. Stated another way, when the PCB board 223 receives a signal to feed, it will calculate the time when the half opening 245a and the opening 259a are aligned. During this time, food will be continuously transported to the food bowl 212, so as to achieve the predetermined desired weight of food. Shortly thereafter, the half opening 245a will rotate and the closed area 245b will then align with the opening 259a, so as to stop the delivery of food. Thereafter, the timing function will continue. When the next set feeding time is reached, the PCB 223 will continue to send signals to the motor 225, and the feed cycle will begin again. Thereafter, so long as the hopper 202 contains food, the pet can be fed regularly, regardless of whether the owner is home or not.

Alternate Exemplary Embodiment

Figure 17:
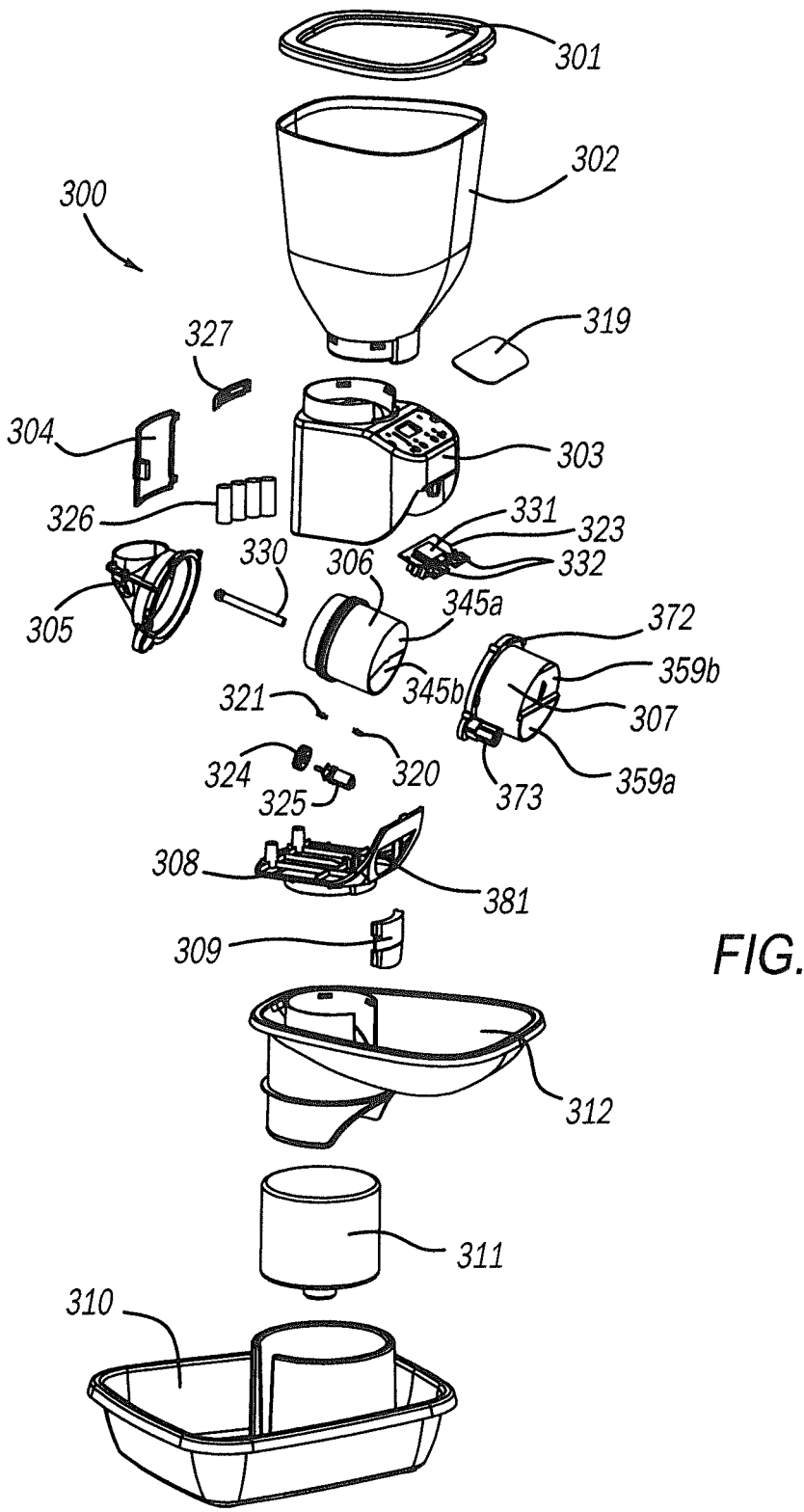
FIG. 17 is an exploded view of a second embodiment of an automatic pet feeder.
Figure 18:
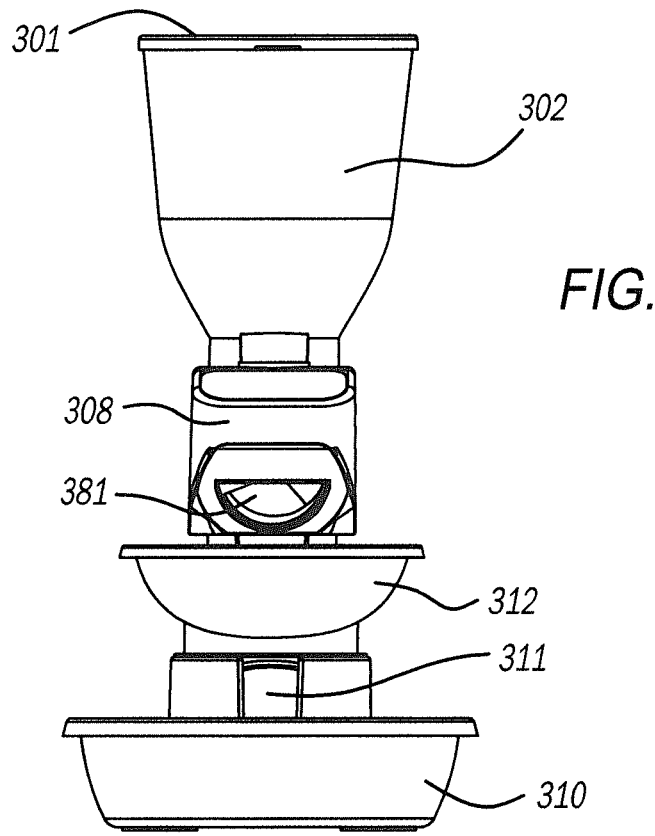
FIG. 18 is a front assembled view of the automatic pet feeder of FIG. 17.
Figure 19:
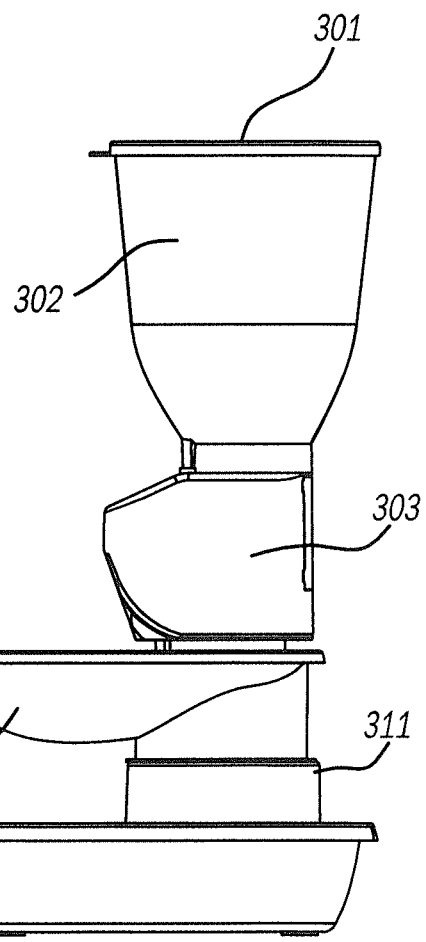
FIG. 19 is a side assembled view of the automatic pet feeder of FIG. 17.
Figures 20, 21:
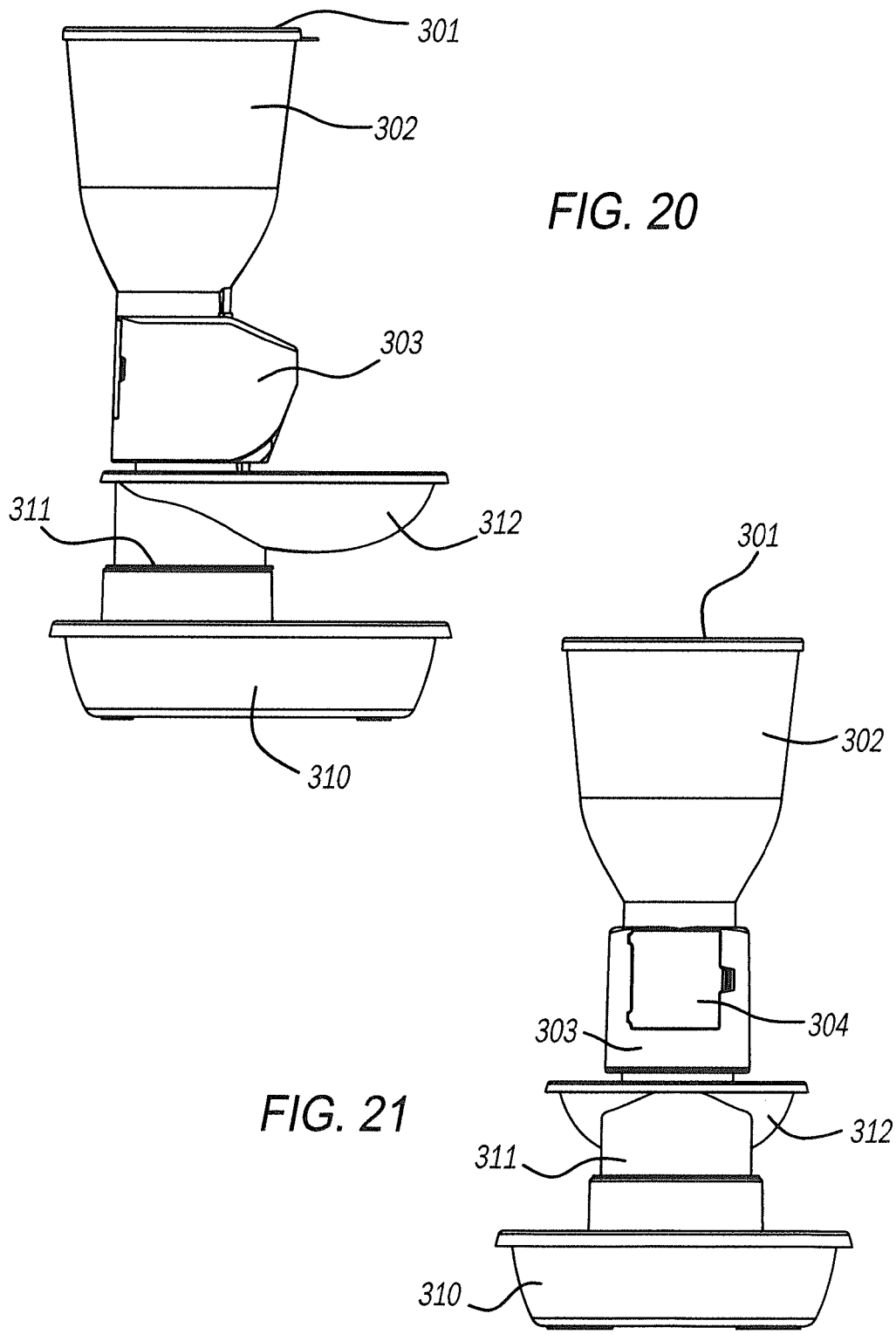
FIG. 20 is a side assembled view of the automatic pet feeder of FIG. 17.
FIG. 21 is a rear assembled view of the automatic pet feeder of FIG. 17.
Figure 22:
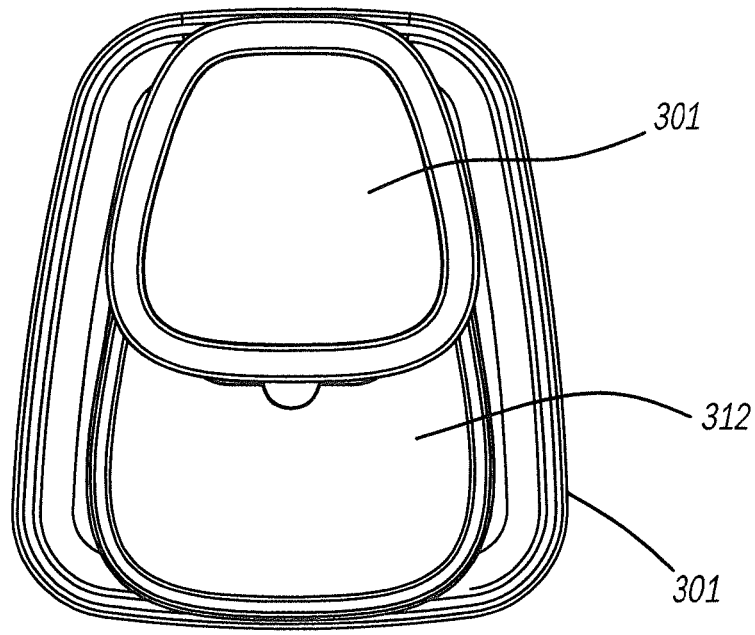
FIG. 22 is a top view of the automatic pet feeder of FIG. 17.
Figure 23:
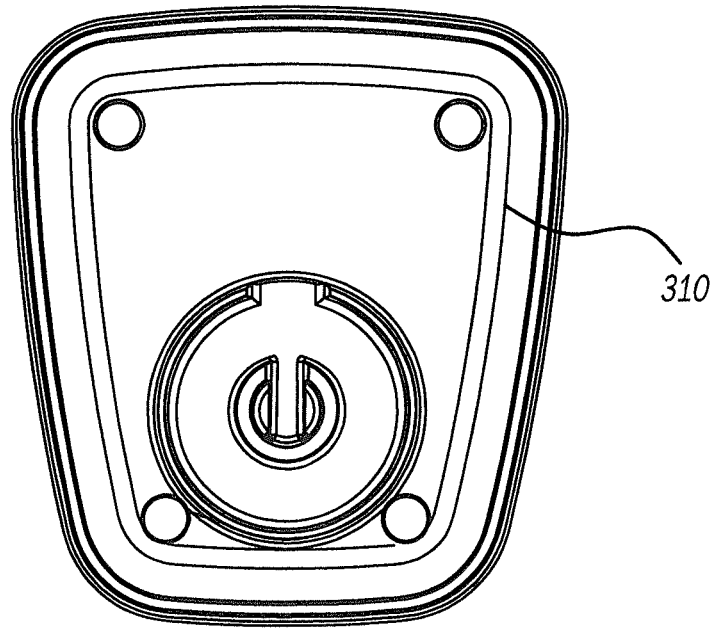
FIG. 23 is a bottom view of the automatic pet feeder of FIG. 17.
Figure 24:
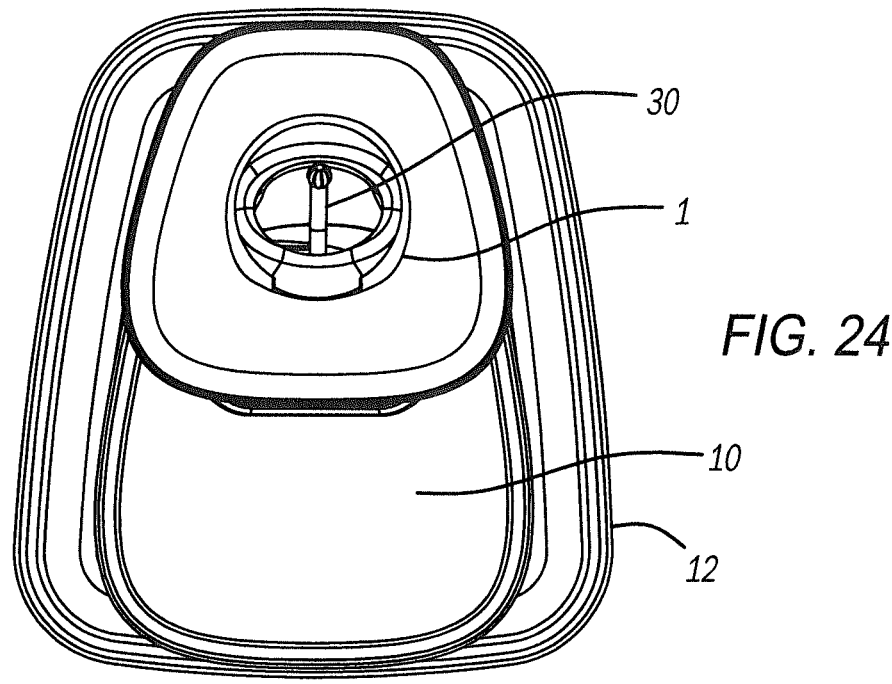
FIG. 24 is an open top view of the automatic pet feeder (with stirring rod) of FIG. 17.

In accordance with the present invention, and in an exemplary embodiment as shown in FIG. 17, the food may be dispensed from a hopper or food reservoir 302 by an automatic pet feeder 300 included within the overall known food and water dispenser described above. It will be appreciated that the automatic feeder system 300 may be configured and positioned between the hopper or food storage reservoir 302, and the second dish 312. Accordingly, a cylindrical spiral extruder pet feeder 300 contains a top shell 303 operably connected to a food hopper or food storage reservoir 302, by snaps, screws, or threads, for example. If desired, a lid 301 may cover the hopper 302 to ensure the food remains clean. As shown in the figures, a first bottom port 331 (circular or otherwise shaped) on the hopper 302 is press fit or otherwise attached onto a first top port 333 (circular or otherwise shaped) on the shell 303, thereby providing a food conduit from the hopper 302 into the interior of the shell 203. A battery panel 304 may be removably attached to a backside or other area of the shell 303 whereby removal of the panel 304 provides access to batteries 326 stored and operably connected therein. As explained below, the batteries 326 may be used to power the motor 325 actuating the automatic feeder. As also explained below, an inner receiving cavity 344 is defined by the shell 303, for housing a number of automatic feed constituents as described below.

An inner funnel 305 may be contained within inner cavity 344 of the shell 303, and at a first end contains a second upper port 337 coaxially aligned with the first top port 333. A second bottom port 339 may be formed at a second end of the inner funnel 305. A spiral or curved food guide 351 may be integrated within the inner funnel 305 and extend from the second upper port 337 and downwardly and obliquely extend to the second bottom port 339. A first connecting flange 353 is formed about the periphery of the second bottom port 339, thereby providing structural support for containment of a movable screw 306 as described below.

Figure 25:
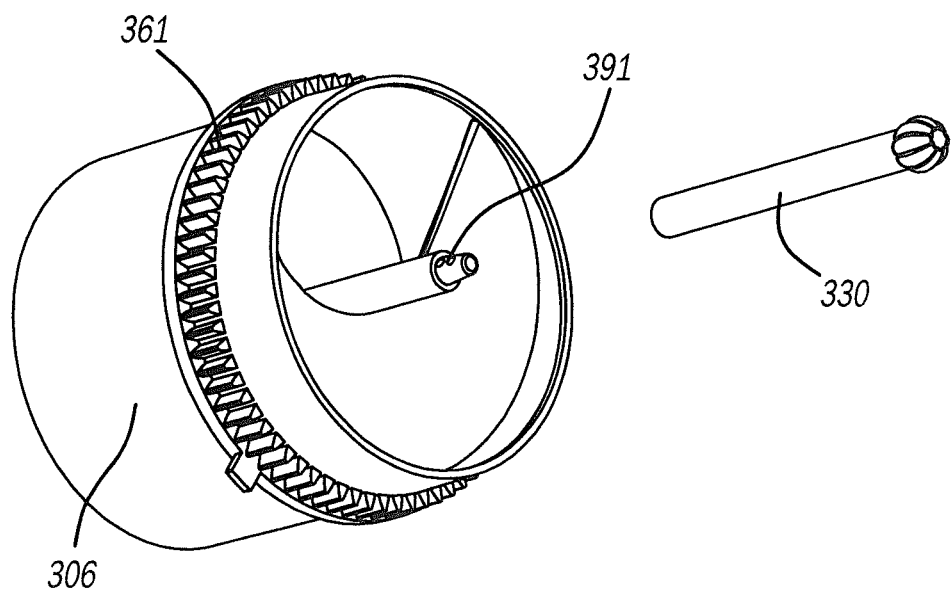
FIG. 25 is a perspective view of the movable screw or extruder with stirring rod.
Figure 26:
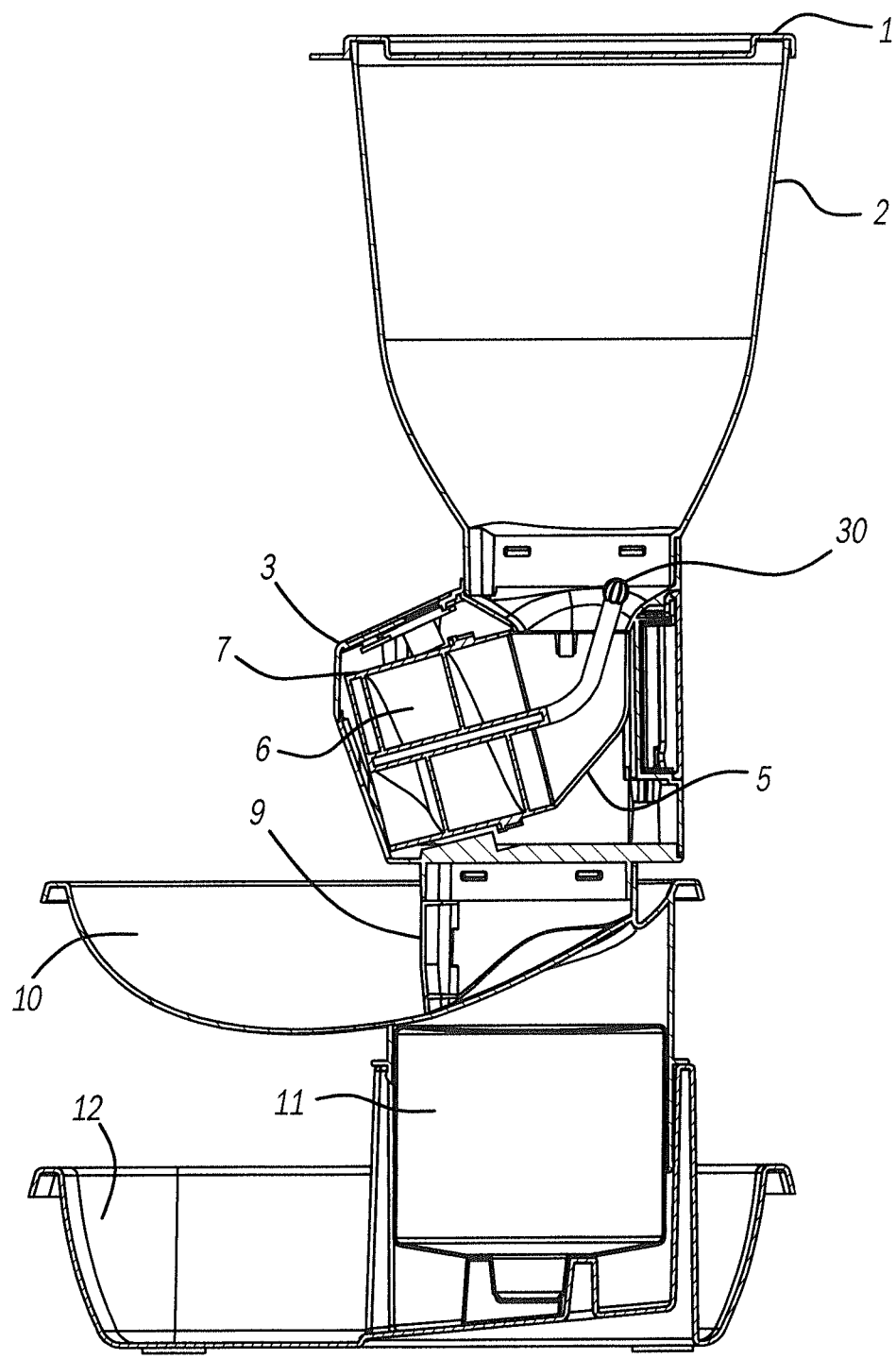
FIG. 26 is a sectional view of the automatic pet feeder of FIG. 17.

As shown in FIGS. 17 and 26, a movable screw or spiral extruder 306 may also be contained within the inner cavity 344, and contains a third upper port 343 and a third bottom port 345, wherein upon movement of the spiral extruder 306, food may be extruded or routed therethrough and into the second or upper food dish 312. As shown in the drawings, the second bottom port 339 of the inner funnel 305 is coaxially aligned with the third upper port 343 of the movable screw 306. A relatively larger first gear 361 may be circumferentially formed or fixed on a screw outer wall 349, on the surface of the outer wall 349, for example. A screw or extruder housing 307 contains a fourth upper port 357 and a fourth lower port 359, wherein the fourth upper port 357 is coaxially aligned with the third upper port 343, and, the fourth lower port 359 is coaxially aligned with the third bottom port 345. The third bottom port 345 has a portion of the port blocked, such as half of the port 345 as shown in FIG. 17. The fourth bottom port 359 has a portion of the port blocked, such as half of the port 359 as shown in FIG. 17 and FIG. 25. As further described herein, as the movable screw 206 is rotated, the respective open portions 345a and 359a of each of the partially occluded ports 345 and 359, coincide or cooperate to permit a desired amount of food to come through the extruder/screw housing 307 as per each predetermined feeding cycle. At the same time, the respective closed portions 345b and 359b coincide or cooperate to contain food within the movable screw 306 and prevent food from leaving the screw 306. Stated another way, and for example, when the closed or occluded area 345b is aligned with the open area 359a, the food will be fixed and retained in the movable screw 306. When the open area 345a is aligned with the open area 359a, the food in the actuated movable screw 306 will flow through the half opening 359a into the food bowl 312.

As shown in FIGS. 17, 25, and 26, a stirring rod (TPU) 330 is threadedly received, integrally molded to, or otherwise fixed and connected to a core 391 of the movable screw or extruder 306, and extends upwardly into the inner funnel 305, for stirring of the food migrating therethrough. As a movable screw 306 rotates, the stirring rod 330 also rotates to agitate the flow of food and thereby prevent jamming of the food within the inner funnel 305.

Accordingly, in operation, the motor 325 drives the pinion gear 324 to rotate, thereby driving the large gear 361 and the movable screw 306 to rotate, so that the half opening 345a or the closed area 345b is aligned with the opening 359a, so as to provide automatic feeding in accordance with the present invention. Importantly, the motor 325, the pinion gear 324, and the large gear 361 are located outside the movable screw 306, thereby ensuring the stability and reliability of the automatic feed system 300, and also the free and unjammed flow of food therethrough.

In another aspect of the invention, an inner wall 363 of the screw housing 307 is slidably engaged over the extruder outer wall 349. A second flange 365 is formed about the periphery of the fourth upper port 357, that when engaged with the first flange 353, forms an annular groove 372 for containment of the gear 361. The connecting flanges 353 and 365 may be snapped, screwed, or otherwise fixed together. While the screw housing 307 is fixed in place, the movable extruder 306 moves within and is slidably engaged with the housing 307 and adjacent to the fixed inner funnel 305, as the movable extruder or screw 306 is actuated by a predetermined signal from a motor 325 (described below).

A relatively smaller pinion gear 324 meshes with the first gear 361 and operably communicates therewith for actuation of the movable screw 306. A motor 325 is operably connected to the pinion gear 224 (and fixed within the inner cavity 244) by way of a drive shaft 367, for example, to drive the pinion gear 324 and thereby drive the larger gear 361, as the pinion gear 324 enmeshed therewith turns. As a result, the movable screw or spiral extruder 306 is then moved with movement of the larger gear 361, to thereby drive food from the inner funnel 305 through the movable screw or extruder 306. The motor 325 may be powered by the batteries 326, and actuated by sensors as described below. Yet further, the screw or extruder housing 307 may also contain a second or mounting groove 372 formed within the housing 307 so that the pinion gear 324 may extend therethrough and mesh with the larger gear 361. It will be appreciated that the pinion gear 324 and the motor 325 are preferably contained with the inner cavity 344.

With regard to electronic controls in the system 300, the PCB board may be located in the inner cavity 344, and is electronically connected in a known manner to the motor 325, such as signal generation (PWM), for example. As such, the primary purpose of the PCB board is the actuation of the motor 325. The PCB or process control board 323 may be electronically connected to and powered by the battery pack 326 in a known manner. Or, the PCB 323 and the automatic pet feeder 300 may be electrically powered by AC energy or rechargeable batteries, for example. To that end, various controls are provided that measure portions of food or time for example, as determined by predetermined settings predetermined by the user.

Figure 27:
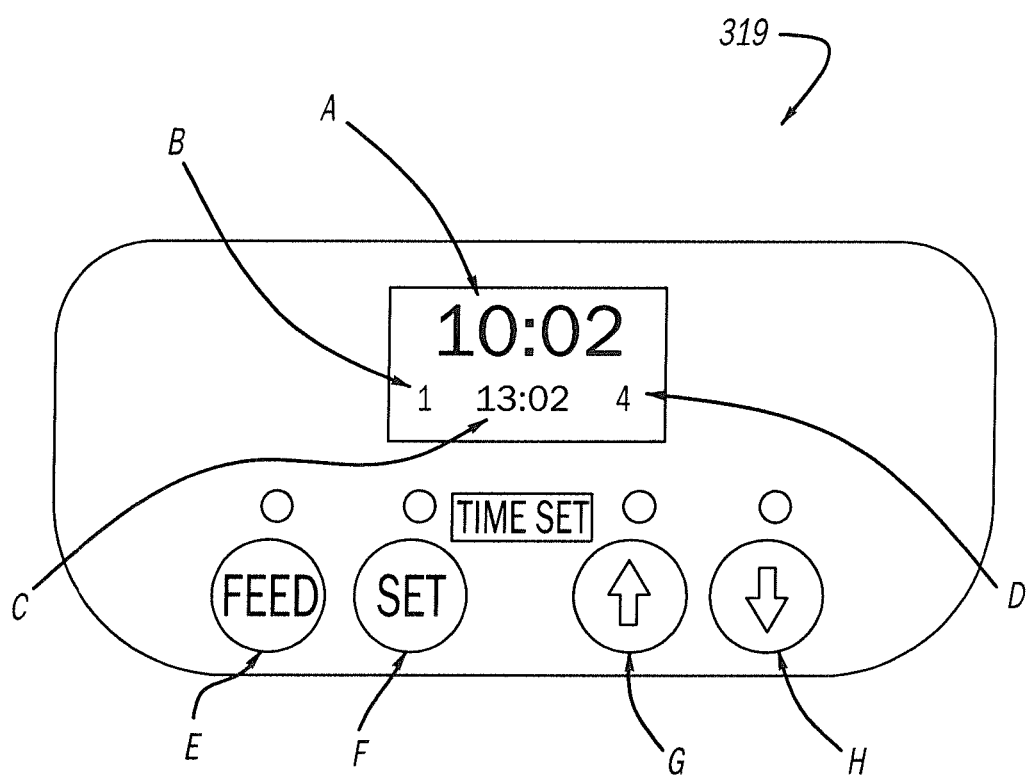
FIG. 27 is a view of the control panel of the automatic pet feeder of FIG. 17.
Figure 28:
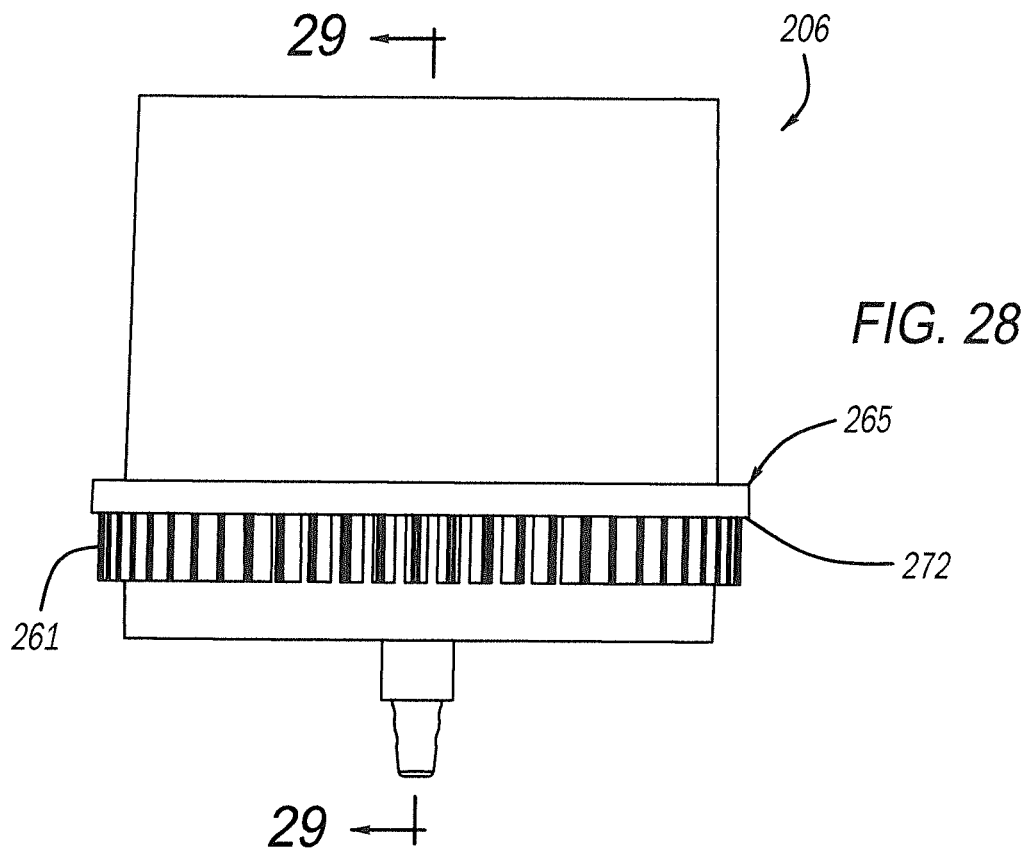
FIG. 28 is a side view of the movable screw or extruder of FIG. 12.
Figure 29:
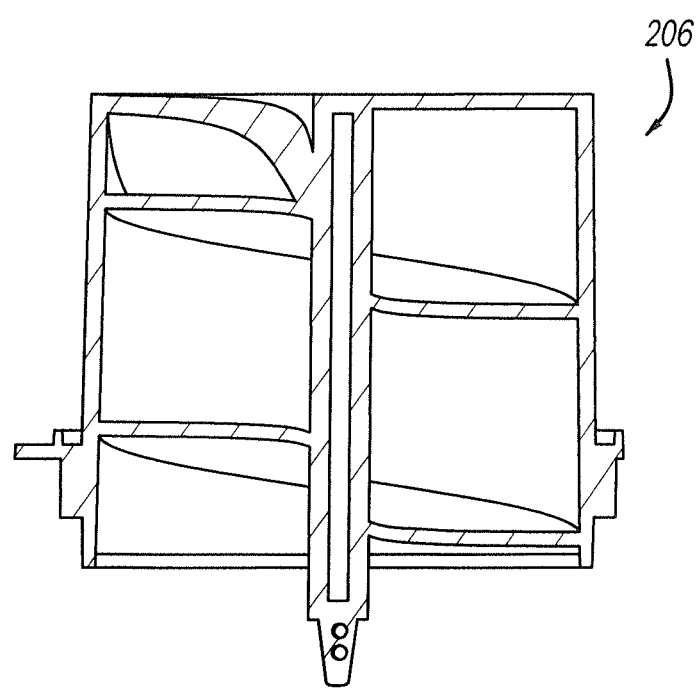
FIG. 29 is a sectional view of the movable screw or extruder of FIG. 12, taken along the line A-A of FIG. 28.
Figure 30:
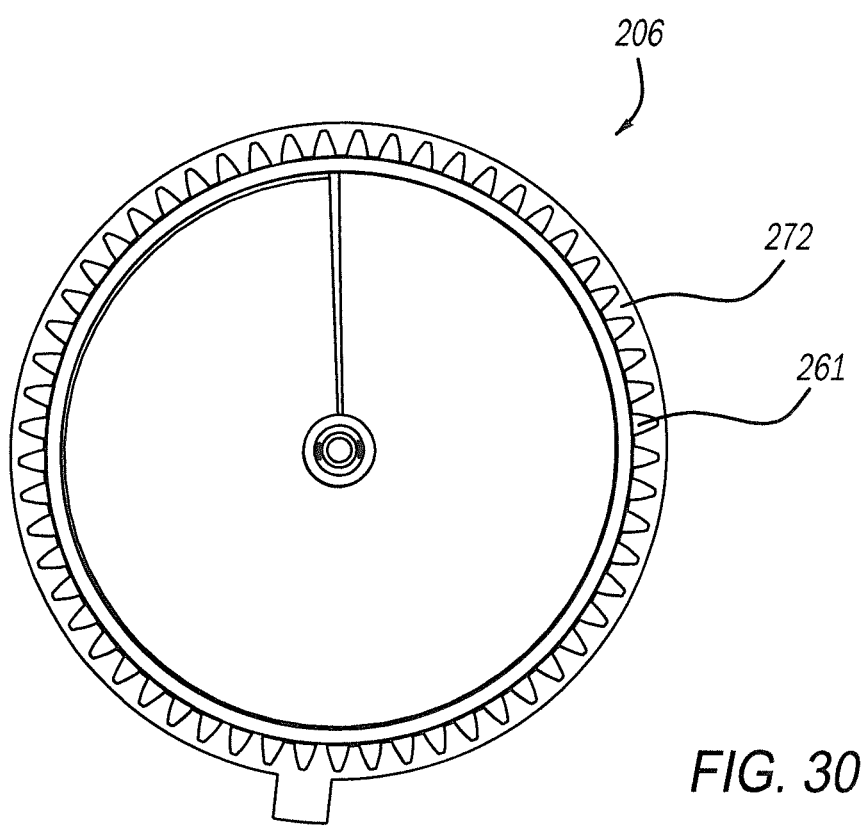
FIG. 30 is a rear view of the movable screw or extruder of FIG. 12.

As shown in FIG. 17 and in other figures, a touch screen panel 319 is provided on the top of the shell housing 303, and contains sensing buttons 332 and an organic light emitting diode (OLED) panel 331, all being connected to the PCB board 323. The food dosage and feed 2C times can all be set by actuating the appropriate buttons on the touch panel screen 319. For example, and not by way of limitation, as shown in FIG. 27, one button pertains to setting feed weight or portions, local time, or feeding time (F); one button pertains to instant or immediate feeding (E); one button pertains to time of feed(s), one up-arrow button pertains to increasing what is being measured (G) and one button pertains to decreasing what is being measured (H) (time or weight or feed times). Illuminated displays or appropriate readouts display the various selected controls made by these buttons such as local time (A), number of feed/feedings per day (C), number of time/times feeding/day (B), and number of feeding portions at specific times of feeding (D), and so forth. Again, all controls described herein may also be powered by the battery pack 326, containing a plurality of batteries, four for example.

In yet another aspect of the controls, and as schematically shown in FIG. 17, for example, an infrared diode emitter 320 is installed on the screw extruder housing 307 and an infrared diode receiver 321 is installed on the movable screw or extruder 306. The infrared diode emitter 320 and the infrared diode receiver 321 mainly function for positioning the movable screw 306 movement and the screw extruder housing 307. Specifically, when the movable extruder or screw 306 rotates, the infrared diode transmitter 320 fixed thereon also rotates. When the movable infrared diode transmitter 320 and the fixed infrared diode receiver 321 align and sense, it indicates that the rotation is in place and operably communicates with and/or feeds back a signal to the PCB 323. Thereafter, the PCB 323 will control the motor 325 to stop rotating as per predetermined instructions. If desired, this embodiment may include an LED indicator 322 mounted on the top housing 303, and signally or electronically connected to the PCB 323. If desired, a testing button 319 located on the top of the top shell 303, may be provided in operable communication with the PCB 323 to confirm the amount of food dispensed.

A bottom housing 308 may be installed at the bottom of the upper housing 303 and may be snapped, fastened, screwed, or otherwise fixed into a bottom portion of the upper housing 303. In this way, the inner cavity 344 is closed up to protect and better maintain the parts contained therein. An opening 381 overlies the fourth bottom port 359 and opening 359a, thereby permitting disbursement of the food through the bottom housing 308. A door or food baffle 309 covers the opening 381 to control food release into the bowl 312.

The rest of the automated pet feeder 300 may be made as described above for the gravitational pet feeder. Referring to FIG. 1, an embodiment of the apparatus comprises a first dish member 10 for providing water to a pet and a second dish member 12 for providing food to the pet, where the first dish member and second dish member are disposed in a stacked configuration. The first dish member 10 comprises a first floor 16. The first floor 16 comprises a first top surface 17 and a first bottom surface 19. First wall member 14 encloses the first top surface 17 of the first dish member 10. The second dish member 12 comprises a second floor 20. The second floor 20 comprises a second top surface 21 and a second bottom surface 23. A second wall member 18 encloses the top surface 21. The first dish member 10 further comprises an upwardly extending pillar member 22 affixed to the first top surface 17. The pillar member 22 may comprise a single piece which connects first dish member 10 to second dish member 12, and maintains these members in vertical spaced apart relation with one another. Alternatively, pillar member 22 may comprise a plurality of sections including base member 25 and column member 27. The base member 25 is adapted to receive column member 27, wherein the column member supports the second dish member 12. Column member 27 may attach to base member 25 via friction fit or other known means of attachment, such that second dish member 12 and column member 27 are removable, facilitating cleaning of the various components of the apparatus. The top of the column member 27 is adapted to attach to the second bottom surface 23 of the second dish member 12.

The base member 25 may comprise an arcuate wall member as shown in FIGS. 8-9. The bottom of column member 27 may attach to base member 25 via friction fit or other known means of attachment. Base member 25 and column member 27 may be so oriented as to define a vertical axis. As shown in the various figures, the second dish member 12 may be disposed above the first dish member 10 in such a way that the second dish is substantially offset from the first dish about the vertical axis defined by the base member 25 and the column member 27. The friction attachment of base member 25 and column member 27 to one another enables the user to adjust the offset between first dish member 10 and second dish member 12 as desired. This feature of the device allows the user to orient the respect dish members in such a manner as to prevent or reduce food from falling from second dish member 12 into water which may be stored in first dish member 10. This feature also provides easier access to the first dish 10 by the pet, because second dish member 12 is not blocking access to first dish member 10.

As shown in the figures, the first dish member 10 and the second dish member 12 may generally comprise the same shape. However, the first dish member 10 may be sized larger than the second dish member 12 to increase the stability of the device. The first dish member 10 and second dish member may comprise a variety of shapes, including the trapezoidal shapes shown in the figures. Pillar member 22 is peripherally bound by the first wall member 14, but does not make contact with the wall member. This feature of the device causes a "moat" to be formed around the pillar member 22 by the remainder of the first dish member 10, such that water contained within the dish member will prevent or discourage pests from gaining access to pillar member 22. As shown by the Figures, the only access crawling insects have to the food dish member 12 is by crawling up pillar member 22, and this access is precluded by the water contained within the first dish member 10.

The apparatus may further comprise means for replenishing the water in first dish member 10. For example, a bottle reservoir 11 may be attached to the first dish member 10, wherein the bottle reservoir is inverted, and the mouth of the bottle set at the desired water level line within the first dish member 10. As the water level in the first dish member 10 drops, water gravitates from the bottle into the first dish member 10. The bottle reservoir 11 may be stored within the upwardly extending pillar member 22.

In operation, the food in the hopper or food reservoir 302 will gravitationally feed and enter the inner hopper 305, and then be gravitationally fed into the movable extruder or screw 306 vis a vis the guide 352. The user may adjust the feeding amount and the feeding interval times as described above with regard to the touch screen panel 319. After receiving the signals from the touch screen sensing panel 319 and the appropriate buttons 332, the PCB board 323 will send an operating signal to the motor 325 within the specified time. It should be noted that the weight or dosage amount of the food can be calibrated to be a specific amount at each automatic "feeding". Yet further, the time that each feeding occurs may be calibrated as well whereby several feeding times per day could be determined if desired. For example, the timing regulator could actually be set to determine the time lapse between any feeding and subsequent feeding.

The motor 325 then drives the pinion gear 324 to rotate, thereby driving the large gear 361 and the movable extruder or screw 306 to rotate. When the infrared diode transmitter 220 and the infrared diode receiver 321 are aligned as the movable screw 306 rotates, it may rotates, it may confirm that the rotation and time of rotation have occurred, and feed a signal back to the PCB board 323 confirming the same. At this time, or thereafter, depending on desired rotations, for example, the PCB board 323 will direct the movable screw 306 to stop rotating. Stated another way, when the PCB board 323 receives a signal to feed, it will calculate the time when the half opening 345a and the opening 359a are aligned. During this time, food will be continuously transported to the food bowl 312, so as to achieve the predetermined desired weight of food. Shortly thereafter, the half opening 345a will rotate and the closed area 345b will then align with the opening 359a, so as to stop the delivery of food. Thereafter, the timing function will continue. When the next set feeding time is reached, the PCB 323 will continue to send signals to the motor 325, and the feed cycle will begin again. Thereafter, so long as the hopper 302 contains food, the pet can be fed regularly, regardless of whether the owner is home or not.

It will be appreciated that the present invention may utilize known technology such as internet-based, or other, remote controls or cameras, all cooperating with the PCB board 323, in a known manner. For example, remote control of the automatic pet feeder 300 may be facilitated by providing a PCB board 323 that has wireless communication with the internet such that the user may remotely communicate with the feeder 300, by smart phone for example.

While the above is a description of various embodiments of the present invention, further modifications may be employed without departing from the spirit and scope of the present invention. Thus, the scope of the invention should not be limited according to these factors, but only to the claims as appended hereto.

What is claimed is:

1. An automatic pet feeding system comprising:
   a first hopper adapted to contain food;
   an inner second hopper adapted to gravitationally receive and obliquely convey food from said first hopper;
   a movable screw adapted to rotate at a predetermined time, and extrude food received from said inner second hopper therethrough, said screw containing a periphery, an inlet, and an outlet;
   a screw housing containing said movable screw and an annular inner wall defining an inner diameter, whereby the periphery of said movable screw is adapted to slidably engage said annular inner wall of said screw housing completely across said inner diameter of said screw housing; and
   a dish for receipt of said food,
   whereby said food is provided at predetermined weights depending on the rotation of said movable screw.

2. The automatic pet feeding system of claim 1 wherein said inner second hopper contains an inner guide for urging the food downwardly and obliquely into said movable screw.

3. The automatic pet feeding system of claim 1 wherein said first hopper, movable screw, and screw housing are contained within an outer shell.

4. The automatic pet feeding system of claim 1 further comprising:
   a process control board for transmission and receipt of signals;
   a dosage regulator for predetermining the weight of disbursed food; and
   a variable resistor weight control in operable communication with said dosage regulator,
   whereby adjustment of said dosage regulator drives the variable resistor weight control to send a signal to the process control board.

5. The automatic pet feeding system of claim 4 further comprising:

a timing regulator for predetermining intervals of time between feedings;

a variable resister timing control in operable communication with said timing regulator, whereby adjustment of said timing regulator drives the variable resistor timing control to send a signal to the process control board.

6. The automatic pet feeding system of claim 1 further comprising:

a process control board for control of automatic feeding;

a motor operably communicating with said process control board;

a first gear circumferentially fixed to the periphery of said movable screw; and a pinion gear in operable communication with said motor and in meshed communication with said first gear, whereby said motor is adapted to be actuated by said process control board to thereby drive said pinion gear, said first gear, and said movable screw.

7. The automatic pet feeding system of claim 1, wherein said movable screw is exclusively contained within said screw housing.

8. The automatic pet feeding system of claim 6, wherein said pinion gear drives said first gear which drives and rotates said movable screw.

9. The automatic pet feeding system of claim 1, further comprising a stirring rod coaxially mounted on the movable screw and extending within said inner second hopper, said stirring rod adapted to rotate concurrently with the movable screw for stirring any food contained within the inner second hopper.

10. The automatic pet feeding system of claim 1 further comprising:

a process control board for transmission and receipt of signals, said process control board operably communicating with said movable screw to drive rotation of said screw; and a touch screen containing control buttons in operable communication with said process control board, whereby the process control board is configured to receive signals from said touch screen to thereby adjust food portions and feed times as selectively determined on said touch screen.

11. The automatic pet feeding system of claim 10 wherein said process control board operably communicates with the internet for remote control of the feeding system.

12. An automatic pet feeding system comprising:

a first hopper adapted to contain food;

an inner second hopper adapted to gravitationally receive food from said first hopper;

a movable screw adapted to rotate at a predetermined time, and extrude food obliquely conveyed from said inner second hopper therethrough, said screw containing a periphery, an inlet, and an outlet;

a screw housing containing said movable screw and an annular inner wall defining an inner diameter, whereby the periphery of said movable screw is adapted to slidably engage said annular inner wall of said screw housing completely across said inner diameter of said screw housing;

a process control board for transmission and receipt of signals, said process control board operably communicating with said movable screw to drive rotation of said screw; and a touch screen containing control buttons in operable communication with said process control board, whereby food portions and feed times as selectively determined on said touch screen; and a dish for receipt of said food, whereby said food is provided at predetermined weights depending on the rotation of said movable screw.

13. An automatic pet feeding system comprising:

a first hopper adapted to contain food;

an inner second hopper adapted to gravitationally receive food from said first hopper;

a movable screw adapted to rotate at a predetermined time, and extrude food received from said inner second hopper therethrough, said screw containing a periphery, an inlet, and an outlet;

a screw housing containing said movable screw whereby said movable screw is adapted to slidably engage an inner wall of said screw housing;

a dish for receipt of said food;

a process control board for transmission and receipt of signals;

a dosage regulator for predetermining the weight of disbursed food; and a variable resistor weight control in operable communication with said dosage regulator, whereby adjustment of said dosage regulator drives the variable resistor weight control to send a signal to the process control board, and whereby said food is provided at predetermined weights depending on the rotation of said movable screw.

14. The automatic pet feeding system of claim 13 further comprising:

a timing regulator for predetermining intervals of time between feedings;

a variable resister timing control in operable communication with said timing regulator, whereby adjustment of said timing regulator drives the variable resistor timing control to send a signal to the process control board.

15. The automatic pet feeding system of claim 1 further comprising a stirring rod operably communicating with said movable screw and extending from said movable screw into said inner second hopper.

16. The automatic pet feeding system of claim 12 further comprising a stirring rod coaxial with and operably communicating with said movable screw and extending from said movable screw into said inner second hopper.

17. The automatic pet feeding system of claim 13 further comprising a stirring rod operably communicating with said movable screw and extending from said movable screw into said inner second hopper.

* * * * *